(12) United States Patent
Laumen et al.

(10) Patent No.: US 11,873,921 B2
(45) Date of Patent: Jan. 16, 2024

(54) SERVO-CONTROLLED METERING VALVE AND FLUID INJECTION SYSTEM

(71) Applicant: Electric Power Research Institute, Inc., Palo Alto, CA (US)

(72) Inventors: Hermann Josef Laumen, Heinsberg (DE); Mohamed Douch, Vaals (NL); Stanley Timothy Rosinski, Charlotte, NC (US); Bill Gene Carson, Harrisburg, NC (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 0 days.

(21) Appl. No.: 17/884,071

(22) Filed: Aug. 9, 2022

(65) Prior Publication Data

US 2023/0047177 A1    Feb. 16, 2023

Related U.S. Application Data

(60) Provisional application No. 63/231,588, filed on Aug. 10, 2021.

(51) Int. Cl.
*F16K 49/00* (2006.01)
*G05D 7/06* (2006.01)
*F16K 31/40* (2006.01)
*F16K 15/06* (2006.01)

(52) U.S. Cl.
CPC ............ *F16K 49/00* (2013.01); *F16K 15/065* (2021.08); *F16K 31/406* (2013.01); *F16K 49/005* (2013.01); *G05D 7/0635* (2013.01); *Y02E 20/16* (2013.01)

(58) Field of Classification Search
CPC ......... Y10T 137/6416; Y10T 137/6525; Y10T 137/6552; Y10T 137/7769; F01K 1/165; F01K 13/02; F01K 5/12; F01K 15/065; F16K 49/00; F16K 49/005; F16K 31/406; G05D 7/0635; Y02E 20/16
USPC ...................... 137/334, 338, 339, 487.5, 592
See application file for complete search history.

(56) References Cited

U.S. PATENT DOCUMENTS

| | | | | |
|---|---|---|---|---|
| 1,076,665 | A | * | 10/1913 | Collin .................... F16K 17/105 236/80 R |
| 1,558,757 | A | * | 10/1925 | Reed .................. G05D 16/2095 137/505.22 |
| 3,239,150 | A | * | 3/1966 | Chisel ....................... F02K 9/82 239/289 |

(Continued)

*Primary Examiner* — William M McCalister
(74) *Attorney, Agent, or Firm* — Owens Law Firm, PC

(57) ABSTRACT

The present invention is directed to a metering valve for controlling the amount of a fluid passed through the valve and a servo-valve for controlling the metering valve, wherein the servo-valve is decoupled from the metering valve to thermally distance or thermally isolate the servo-valve from any heat from the fluid passing through the metering valve. The metering valve and servo-valve may be used to attemperate a steam stream in a power plant attemperation system, such as a system for attemperating a superheated steam gas stream from a power plant being used for a heat-recovery steam generator. An integrated metering valve and discharge valve for discharging fluid during periods of non-use is also provide. Changeable throttle plates are also provided that control the flow of the fluid through the control chamber of the metering valve and the discharge valve.

3 Claims, 11 Drawing Sheets

(56) References Cited

U.S. PATENT DOCUMENTS

| | | | | |
|---|---|---|---|---|
| 3,369,561 A * | 2/1968 | Zimmerman | G05D 16/2095 | 137/486 |
| 3,708,976 A * | 1/1973 | Berlyn | F01B 17/04 | 60/39.63 |
| 3,818,699 A * | 6/1974 | Pritchard | F22G 5/12 | 60/665 |
| 3,908,382 A * | 9/1975 | Stone, Jr. | F01K 27/00 | 60/649 |
| 3,972,364 A * | 8/1976 | Brumm | F17D 1/20 | 137/485 |
| 4,476,893 A * | 10/1984 | Schwelm | G05D 7/005 | 251/30.01 |
| 4,656,827 A | 4/1987 | Puillet | | |
| 5,590,684 A * | 1/1997 | Alberts | F15B 13/0871 | 137/637.1 |
| 5,979,790 A * | 11/1999 | Gurich | F02M 63/0026 | 239/533.2 |
| 6,062,532 A * | 5/2000 | Gurich | F15B 13/043 | 137/625.65 |
| 6,082,243 A * | 7/2000 | Schmucker | F15B 13/0431 | 91/392 |
| 6,804,963 B1 * | 10/2004 | Tomoiu | F02B 75/26 | 60/670 |
| 2003/0010848 A1 * | 1/2003 | Laumen | B60L 58/34 | 239/419 |
| 2003/0070711 A1 * | 4/2003 | Bowman | F02M 21/0233 | 137/312 |
| 2004/0124259 A1 * | 7/2004 | Guezennec | H01M 8/04089 | 239/135 |
| 2004/0200221 A1 | 10/2004 | Sorter | | |
| 2006/0076061 A1 * | 4/2006 | Bush | G01N 3/56 | 137/489.5 |
| 2006/0219299 A1 * | 10/2006 | Snowbarger | F16K 37/0091 | 137/487.5 |
| 2006/0225672 A1 * | 10/2006 | Donahue | F02M 25/0224 | 123/25 P |
| 2008/0295805 A1 * | 12/2008 | Laumen | F02M 47/00 | 123/456 |
| 2009/0152375 A1 * | 6/2009 | Schmucker | F02M 63/0005 | 239/88 |
| 2009/0288718 A1 * | 11/2009 | Jablonski | G05D 16/163 | 137/497 |
| 2010/0037867 A1 | 2/2010 | Kleckler | | |
| 2010/0243068 A1 * | 9/2010 | Fisher | F16K 31/1225 | 137/485 |
| 2012/0205568 A1 * | 8/2012 | Bush | G05D 16/2095 | 251/129.15 |
| 2012/0279591 A1 * | 11/2012 | Leutz | B08B 9/00 | 137/565.01 |
| 2013/0276918 A1 | 10/2013 | Haugsjaahabink | | |
| 2013/0284954 A1 * | 10/2013 | Stradinger | F16K 11/044 | 251/30.01 |
| 2020/0232346 A1 * | 7/2020 | Laumen | F22G 5/12 | |
| 2021/0040429 A1 | 2/2021 | Ott et al. | | |

* cited by examiner

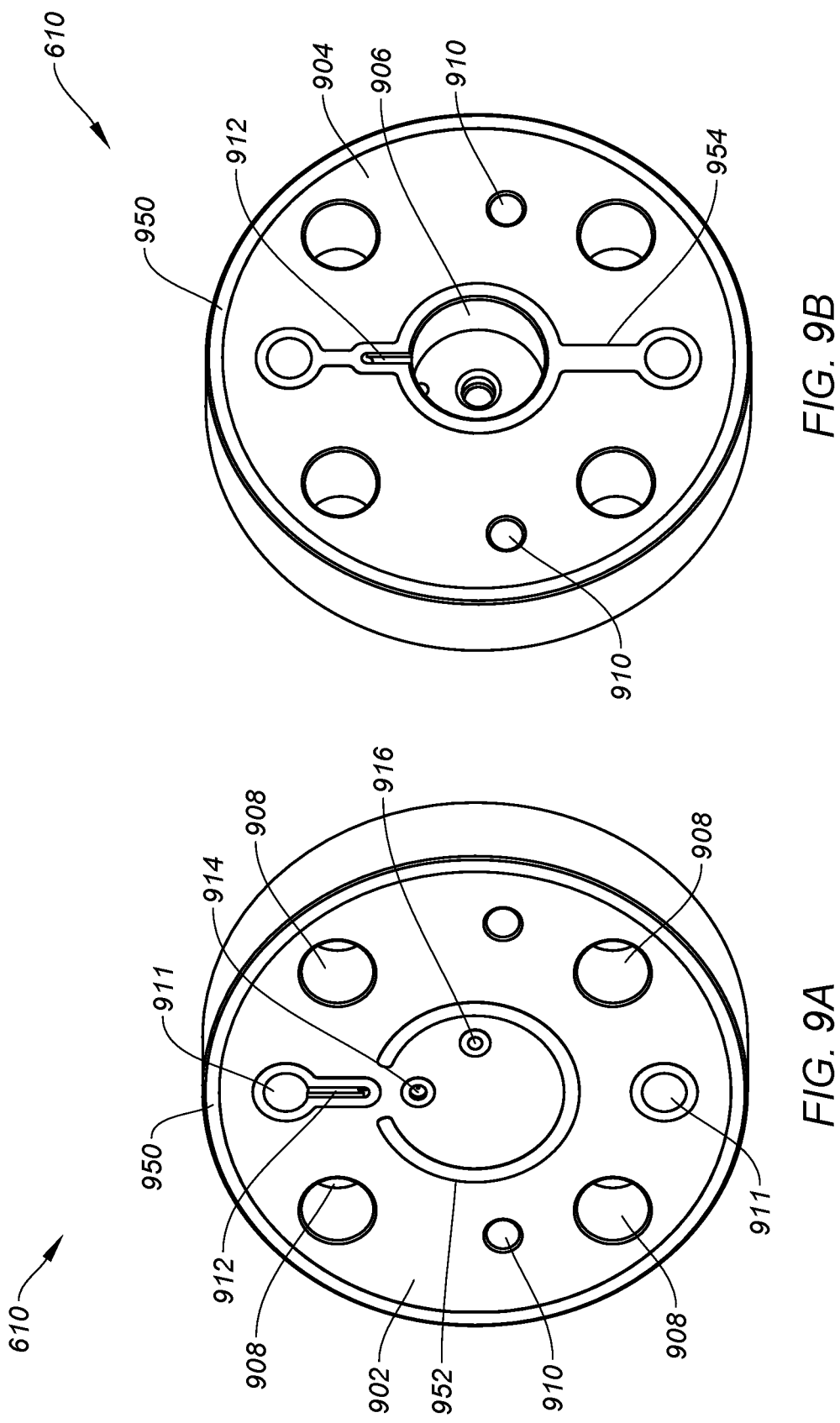

SERVO-CONTROLLED METERING VALVE AND FLUID INJECTION SYSTEM

BACKGROUND OF THE INVENTION

Field of the Invention

The invention, including its various embodiments, relates to equipment for controlling the amount of a fluid passed through the valve. In particular, the invention, including its various embodiments, relates to a metering valve for controlling the amount of a fluid passed through the valve and a servo-valve for controlling the metering valve, wherein the servo-valve is decoupled from the metering valve to thermally distance the servo-valve from any heat from the fluid passing through the metering valve, and having a metering valve and discharge valve design to reduce or eliminate loss of fluid during operation, such as use in attemperating a superheated steam gas stream from a power plant being used for a heat-recovery steam generator.

Description of Related Art

Attemperators (also known as desuperheaters) are used in fossil power plants to reduce the temperature of superheated steam (i.e, "desuperheat") to ensure metal temperature limits are not exceeded in downstream equipment. Cooling water is generally added to the superheated steam using a lance or ring-type nozzle arrangement. The cooling water evaporates using the excess heat from the superheated steam, thus reducing the overall steam temperature.

Reliability of attemperators is a significant issue in power plant operations and is a high priority issue for heat-recovery steam generators (HRSGs). Because of the high temperature and pressure environment, failure of attemperator nozzles/assemblies are common, especially during startup conditions and flexible operations, and lead to rapid thermal fatigue of the attemperator material and surrounding piping, plugging of HRSG tubing due to loose parts, and reduced operational control. It is anticipated that current trends towards even more flexible operation will result in a further reduction in attemperator reliability and limit the ability of the combined cycle fleet to respond to market demands or otherwise backup renewable generation.

Additionally, present attemperator system designs require significant lengths of downstream piping prior to fittings/elbows, etc., to ensure adequate mixing and minimize thermal quenching. However, newer HRSG plant designs and many existing plants do not provide adequate downstream piping length. This has resulted in continued degradation issues as well.

Additionally, some systems utilize multiple nozzles with all of the nozzles controlled by a single valve. Also, in such cases, the valve may be a relatively slow valve leading to less precise control over the amount of water being injected.

Accordingly, there exists a need to improve upon attemperator design and operation to reduce such reliability issues and thereby improve operation of attemperators, in particular in connection with HRSG plants. In particular, there is a need for improvements in the design and operation of the equipment used in attemperating, including the equipment used to control and deliver the cooling water to enhance overall reliability of attemperators. Such improvements in reliability would provide an improved ability of HRSGs to accommodate flexible operations and meet market demands.

BRIEF SUMMARY OF THE INVENTION

The present invention is directed to a metering valve for controlling the amount of a fluid passed through the valve and a servo-valve for controlling the metering valve, wherein the servo-valve is decoupled from the metering valve to thermally distance or thermally isolate the servo-valve from any heat from the fluid passing through the metering valve.

In some embodiments, the fluid may be water that is being injected into a steam stream to attemperate the steam. For example, the metering valve and servo-valve may be used to attemperate a steam stream in a power plant attemperation system, such as a system for attemperating a superheated steam gas stream from a power plant being used for a heat-recovery steam generator.

In some embodiments, the present invention is directed to a system and related equipment for controlling the amount of a fluid passed through the valve that is designed to minimize or prevent the loss of fluid during operation, such as during attemperation of a gas stream. In particular, the invention relates to a metering valve for controlling the amount of a fluid passed through the valve and a servo-valve for controlling the metering valve and associated piping for passing the fluid to and from the metering valve. In addition, a drain line with a discharge valve for receiving and draining fluid from the piping or equipment downstream of the metering valve is used for instances in which the fluid accumulates in such piping or downstream equipment and requires discharge In some embodiments, the discharge valve and metering valve are designed as a 4-way, 2-position valve connected to both the fluid feed line to the metering valve and the output line from the metering valve as well as the discharge line. It should be appreciated that this system may utilize the same servo-valve that is thermally separated from the metering valve as described above.

In some embodiments, the present invention is an apparatus for controlling a metering valve, comprising a servo-valve comprising an actuator for operating the servo-valve; and a tube having a first end connected to the servo-valve and an opposite second end for connection to a metering valve, wherein the tube has a predetermined length to thermally isolate the actuator and the servo-valve from the metering valve to prevent an increase in a temperature of the actuator caused by heat from the metering valve above an operating temperature of the actuator. In another embodiment, the present invention is an apparatus for controlling a metering valve, comprising a metering valve for metering a fluid; a servo-valve comprising an actuator for operating the servo-valve; and a tube having a first end connected to the servo-valve and an opposite second end for connection to the metering valve, wherein the tube has a predetermined length to thermally isolate the actuator and the servo-valve from the metering valve to prevent an increase in a temperature of the actuator caused by heat from the metering valve above an operating temperature of the actuator.

In some embodiments, the present invention is an apparatus for controlling An apparatus for controlling fluid flow, comprising a first portion comprising a metering valve for controlling the passage of fluid through the metering valve and into a feed line that passes the fluid to an injection device; and a second portion connected to the first portion comprising a discharge valve for discharging fluid from the feed line when the metering valve is closed, wherein the discharge valve is actuated by the metering valve.

In some embodiments, the present invention is a system for attemperating a gas stream generated by a power plant, comprising an injection valve for injecting a fluid into a gas stream generated by a power plant to attemperate the gas stream; a metering valve for feeding the fluid to the injection valve through a feed line; a discharge valve connected to the metering valve to discharge fluid from the feed line when the injection valve and the metering valve are closed, wherein the discharge valve is actuated by the metering valve; a servo-valve for opening and closing the metering valve; and a tube having a first end connected to the servo-valve and an opposite second end for connection to the metering valve, wherein the tube has a predetermined length to thermally isolate the actuator and the servo-valve from the metering valve to prevent an increase in a temperature of the actuator caused by heat from the metering valve above an operating temperature of the actuator.

The present invention provides the ability to operate a servo-valve that controls a metering valve in higher temperature applications. For example, some solenoids and piezoelectrical actuators in servo-valves reach their operational limits at temperatures around 160° C. By thermally isolating the servo-valve from the metering valve and the fluid passing through the metering valve, heat from the fluid and metering valve does not pass to the servo-valve, thus permitting the use of the metering valve in higher temperature applications.

In addition, a drain line with a discharge valve for receiving and draining fluid from the piping or equipment downstream of the metering valve is used for instances in which the fluid accumulates in such piping or downstream equipment and requires discharge. The accumulation of fluid in piping downstream of the metering valve when the fluid is not being passed, may result in the unwanted injection of fluid into the corresponding gas stream. The present invention provides a discharge valve designed in combination with the metering valve to accommodate drainage as needed from the piping and equipment downstream of the metering valve without a loss of fluid from the system.

Further, in some embodiments, a system for injecting a fluid into another fluid may include the use of multiple nozzles with each nozzle having a metering valve and a servo-valve. In such embodiments, the combined servo-valve and metering valve may be faster valves compared to other systems. Accordingly, such systems may utilize multiple sets of metering valve and servo-valves, with each set controlling a single nozzle. In such embodiments, these systems provide more precise control of the overall amount of fluid being injected.

In some embodiments, a combination metering valve controlled by a thermally decoupled servo-valve and a discharge valve is provided for injecting a fluid into a given stream, such as for injecting water into a superheated steam stream from a power plant being used in conjunction with a heat-recovery steam generator to attemperate the gas stream. In such embodiments, throttle plates are used to provide throttles or orifices for controlling the flow of the fluid through the control section of the metering valve and through the discharge valve. These throttle plates can be switched with other throttle plates having differently designed or sized orifices to provide the optimal control for a given use of the metering valve.

The present invention encompasses a breakthrough in the attemperation of steam temperature in thermal power plants. The present invention can provide an extremely fine attemperation spray that will improve reliability, ensure rapid mixing of the injected cooling water (minimizing need for long, straight downstream piping runs) and provide for better operational control under more severe flexible operation regimes.

BRIEF DESCRIPTION OF THE SEVERAL VIEWS OF THE DRAWINGS

FIG. 9A is a perspective view of a throttle plate for the metering valve of FIG. 6 according to one embodiment of the present invention;

FIG. 9B is another perspective view of the throttle plate of FIG. 9A according to one embodiment of the present invention;

DETAILED DESCRIPTION OF THE INVENTION

Figure 1:
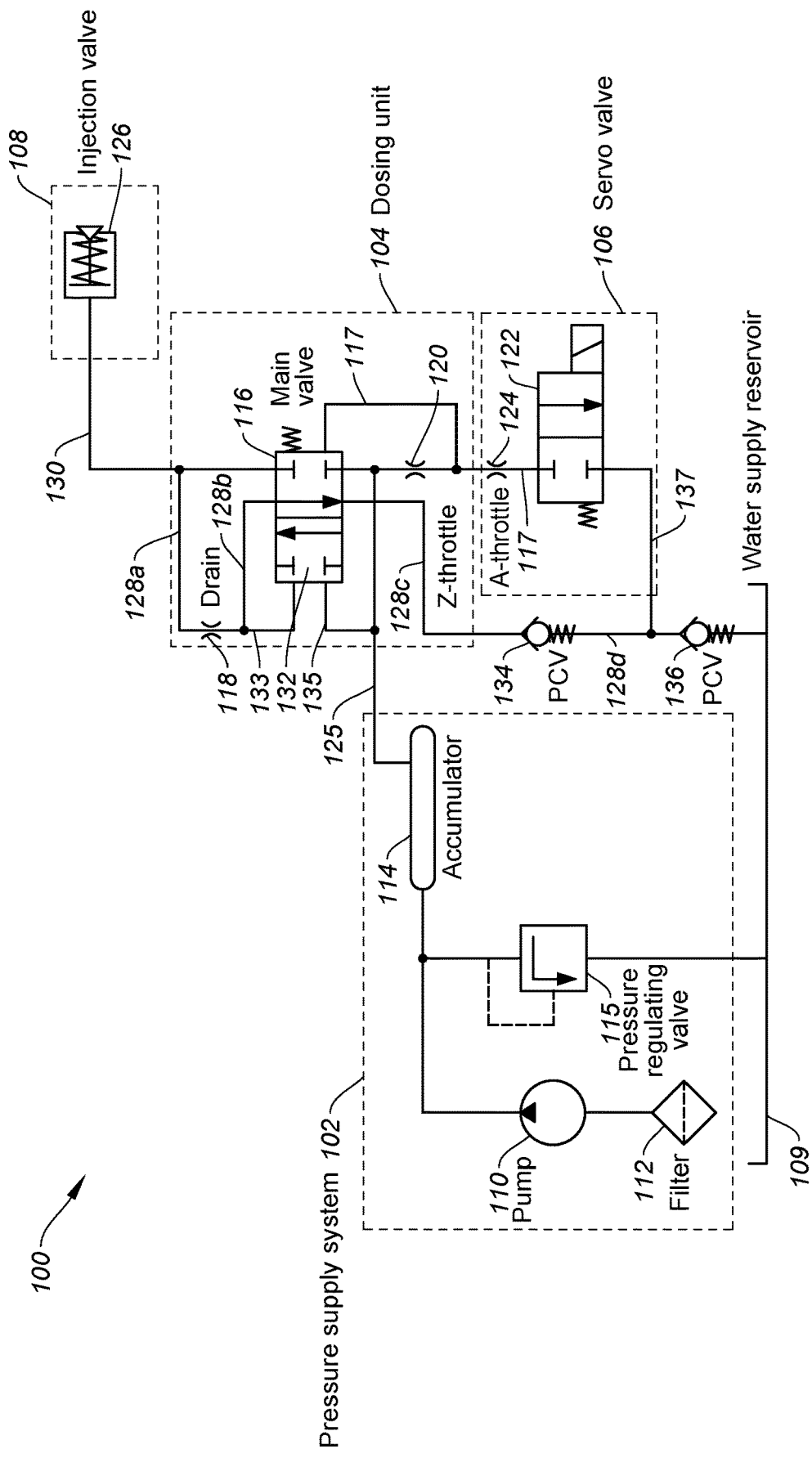
FIG. 1 illustrates a process flow schematic for a fluid injection system for injecting a fluid into another fluid stream according to one embodiment of the present invention.

The present invention is more fully described below with reference to the accompanying drawings. While the present invention will be described in conjunction with various embodiments, such should be viewed as examples and should not be viewed as limiting or as setting forth the only embodiments of the invention. Rather, the present invention includes various embodiments or forms, various related aspects or features, and various uses, as well as alternatives, modifications, and equivalents to the foregoing, all of which are included within the spirit and scope of the invention and the claims, whether or not expressly described herein. Further, the use of the terms "invention," "present invention," "embodiment," and similar terms throughout this description are used broadly and are not intended to mean that the invention requires, or is limited to, any particular embodiment or aspect being described or that such description is the only manner in which the invention may be made or used.

In general, the present invention is directed to a system and equipment for controlling the amount of a fluid passed through a valve. In particular, the invention, including its various embodiments, relates to a metering valve for controlling the amount of a fluid passed through the valve to an ultimate destination and a servo-valve for controlling the metering valve. In some embodiments, the present invention also includes associated equipment, including pumps and piping for providing the fluid from a source to the metering valve and for passing the fluid to its destination downstream the metering valve for its ultimate use, such as an injection device such as a nozzle.

In some embodiments, the present invention is directed to a metering valve for controlling the amount of a fluid passed through the valve and a servo-valve for controlling the metering valve, wherein the servo-valve is decoupled from the metering valve to thermally distance or thermally isolate the servo-valve from any associated with the fluid that may be transferred to the servo-valve from the fluid passing through the metering valve. Such thermal decoupling minimizes or prevents heat from the fluid passing through the metering valve increasing the operating temperature of the servo-valve, which in turn allows for operation of the servo-valve at a more desirable temperature. In some embodiments, the servo-valve may be thermally decoupled by physically distancing the servo-valve from the metering valve. In such embodiments, the physical or spatial separation of the servo-valve from the metering valve further allows for the separate cooling of the servo-valve if desired through the use of a separate cooling system, wherein such cooling can similarly be thermally decoupled from the metering valve to not provide a heat sink for loss of heat from the fluid.

In some embodiments, the fluid may be water that is being injected into a steam stream to attemperate the stream. For example, the metering valve and servo-valve may be used to attemperate a steam stream in a power plant attemperation system, such as a system for attemperating a superheated steam gas stream from a power plant being used for a heat-recovery steam generator. In such cases, the temperature of the water being injected into the steam stream may exceed 160° C. and may be significantly higher than the desired or optimal operating temperature of the servo-valve. For example, in cases where the servo-valve is a solenoid or piezoelectrical actuator, such are not designed to operate at such high temperatures. If the servo-valve were positioned next to the metering valve, the heat from the water would transfer from the water to the servo-valve resulting in an increase in the operating temperature of the servo-valve or the temperature of the surroundings in which the servo-valve is operating. This temperature increase may then exceed the desired operating temperature for the servo-valve, potentially leading to damage and premature failure of the servo-valve and a reduction in overall reliability of the attemperating system. By thermally decoupling the servo-valve from the metering valve, exposure of the servo-valve to the heat from the water passing through the metering valve is minimized or avoided. Accordingly, the servo-valve can operate at a more desirable temperature, thus providing enhanced reliability and reducing or eliminating thermal damage to the servo-valve.

In some embodiments, the present invention is directed to a system and related equipment for controlling the amount of a fluid passed through a valve that is designed to minimize or prevent the loss of fluid during operation, such as during attemperation of a gas stream. In particular, the invention relates to a metering valve for controlling the amount of a fluid passed through the valve and a servo-valve for controlling the metering valve and associated piping for passing the fluid to and from the metering valve. In addition, a drain line with a discharge valve for receiving and draining fluid from the piping or equipment downstream of the metering valve is used for instances in which the fluid accumulates in such piping or downstream equipment and requires discharge. For example, during attemperation of a steam gas stream by injecting water, there are periods of time when the water is not being injected, and water remaining near the injection point may increase in temperature causing an increase in pressure in the line and injection nozzle. Such a pressure increase may result in the inadvertent injection of water that is otherwise not required or desired. Accordingly, the system provides for maintaining the pressure upstream of the injection device or nozzle below that of the stream into which the fluid is being injected during periods when the fluid is not being injected. For example, the system maintains the pressure in the water line being fed to the injection device or nozzle below that of the steam pressure in the line into which the water is being fed during periods when the water is not being injected. A drain line can be used to discharge any such water in the water line upstream of the injection device or nozzle during periods when no injection of water into the steam stream is required. However, such discharge would be the equivalent of a loss of the water or fluid. To improve efficiency and avoid such fluid loss, the present invention provides a discharge valve designed in combination with the metering valve to accommodate drainage as needed from the piping and equipment downstream of the metering valve without a loss of fluid from the system. In some embodiments, the discharge valve and metering valve are designed as a 4-way, 2-position valve connected to both the fluid feed line to the metering valve and the output line from the metering valve as well as the discharge line. It should be appreciated that this system may utilize the same servo-valve that is thermally separated from the metering valve as described above.

In some embodiments, the metering valve and thermally decoupled servo-valve are used in a fluid injection system for injecting water into a superheated steam stream from a power plant being used in conjunction with a heat-recovery steam generator to attemperate the gas stream. In such embodiments, the temperature of the water injected may be approximately 160° C. However, the temperature of the actuator portion of the servo-valve should be maintained below about 100° C. and in some embodiments, below about 80° C. for proper functioning. Accordingly, by providing a servo-valve that can be decoupled from the metering valve, a physical separation or distancing can be provided that reduces or eliminates any heat transfer to the servo-valve from the water being injected as it passes through the metering valve. A tube having a given length can be used to concurrently distance the servo-valve from the metering valve and to connect the servo-valve to the metering valve for purposes of using the servo-valve to control the opening and closing of the metering valve. Such a physical separation between the servo-valve and the metering valve also allows for more efficient cooling of the servo-valve using a separate cooling system if desired.

In some embodiments, a combination metering valve controlled by a thermally decoupled servo-valve and a discharge valve is provided for injecting a fluid into a given stream, such as for injecting water into a superheated steam stream from a power plant being used in conjunction with a heat-recovery steam generator to attemperate the gas stream. In such embodiments, throttle plates are used to provide throttles or orifices for controlling the flow of the fluid through the control section of the metering valve and through the discharge valve. These throttle plates can be switched with other throttle plates having differently designed or sized orifices to provide the optimal control for a given use of the metering valve.

Following, specific embodiments of present invention are described in more detail in conjunction with the Figures. These include a description of an overall fluid injection system, including the metering valve and servo-valve of the present invention along with an injection valve and related equipment, and a specific design for the metering valve, servo-valve, and the combined metering and discharge valve. Various aspects of these designs are described along with various aspects of their use. It should be appreciated that reference to lines, piping, or passageways may be used interchangeably unless specifically designated otherwise. Also, it should be appreciated that the terms "fluid" and "water" may be used interchangeably, although it should be appreciated from the context that in some instances the fluid being referred to is water.

FIG. 1 illustrates a process flow schematic for a fluid injection system for injecting a fluid into another fluid stream according to one embodiment of the present invention. As shown, a fluid injection system 100 includes a source portion 102, a metering portion or dosing unit 104, a servo portion 106, and an injection portion 108, as indicated by the respective dash-lined boxes.

The source portion 102 includes a source 109 of the fluid to be injected and associated equipment to provide the fluid from the source 109. This associated equipment includes a pump 110 that draws the fluid from the source 109 through a filter 112 and pumps the fluid to an accumulator 114 from which the fluid is provided to the metering portion 104. A pressure regulating valve 115 between the line feeding the accumulator 114 and the source 109 may be used to regulate the pressure in the accumulator 114.

The servo portion 106 includes a servo-valve 122 for controlling the metering valve 116 and associated equipment. The servo-valve 122 may be a solenoid or piezoelectrically controlled servo-hydraulic valve that provides precise control over the metering valve 116 to allow for the delivery of predetermined and accurate amounts of the fluid to the injection portion 108. The servo portion 106 also includes various equipment, including a restrictor 124 and various fluid lines and connectors to fluidly connect the servo portion 106 to the metering portion 104 and to the drain system described further below.

As described in more detail below in connection with FIG. 2, it should be appreciated that the servo portion 106 and, in particular, the servo-valve 122, are thermally decoupled or separated from the metering portion 104 and the metering valve 116. In some embodiments, this thermal decoupling is accomplished by physically or spatially separating the servo-valve 122 from the metering valve 116, which can then be fluidly connected to each other using a tube or pipe that spans the distance between the two valves or by any other means known in the art. As described above, the distance between the servo-valve 122 and the metering valve 116 can be determined based upon the maximum temperature desired for the servo-valve 122 and its related components, including its actuator, and the environment in which the overall injection system 100 will be used, including the overall operating environment and temperature, the temperature of the fluid being used, and heat transfer characteristics between the metering portion 104 and the servo portion 106. In some embodiments, thermal decoupling may be accomplished by insulating the servo-valve 122 from the metering valve 116. Also, as described further in connection with FIG. 2, a separate cooling system may be used to cool the servo-valve 122.

For example, in some embodiments, the injection system 100 and the metering valve 116 and servo-valve 122 may be used to attemperate a steam stream in a power plant attemperation system, such as a system for attemperating a superheated steam gas stream from a power plant being used for a heat-recovery steam generator. In such cases, the temperature of the water being injected into the steam stream may exceed 160° C. Accordingly, the addition or transfer of heat to the servo-valve 122 or its actuator from the water passing through the metering valve 116 may be detrimental to its operation or useful life, particularly in cases where the servo-valve 122 utilizes a solenoid or piezoelectrical actuator. Notably, in some embodiments the maximum temperature for proper functioning of the actuator for the servo-valve 122 may be 100° C. or less or 80° C. or less; however, it should be appreciated that this temperature may vary based upon the servo-valve and actuator actually used. Nonetheless, the servo-valve 122 may be positioned a predetermined distance from the metering valve 116 to thermally decouple or separate the servo-valve 122 or its solenoid or piezoelectrical actuator from the fluid passing through the metering valve 116 and avoid the addition of heat to the servo-valve 122 or its solenoid or piezoelectrical actuator.

As noted, the desired thermal decoupling of the servo-valve from the metering valve can be accomplished by physically spacing the servo-valve a given distance from the metering valve. It should be appreciated that the desired distance needed to either control the temperature of the servo-valve 122 or to minimize or avoid heat transfer from the fluid passing through the metering valve 116 to the servo-valve 122 will vary depending upon the temperatures that the servo-valve 122 and the corresponding actuators can tolerate during operation, as well as other factors such as the amount of heat transfer from the fluid to the servo-valve, the operating temperature of the fluid, materials of construction and heat transfer properties of the valves, and temperature of the surrounding environment. It should be appreciated that in some embodiments, the actuator for the servo-valve 122 should be at a temperature of 100° C. or less and in some embodiments at a temperature of 80° C. or less for proper functioning. Accordingly, in some embodiments, the distance between the servo-valve 122 and the metering valve 116 may range from approximately 50-1000 mm. In some embodiments, the distance between the servo-valve 122 and the metering valve 116 may range from approximately 200-500 mm. Nonetheless, it should be appreciated that regardless of the distance, the metering valve and servo-valve may still be manufactured as a single unit that accommodates the desired distance between the two valves.

The metering portion 104 includes a metering valve 116 that meters the amount of fluid being provided to the injection portion 108 and associated equipment. This associated equipment includes various piping arrangements to provide fluid connections between the metering portion 104 and the source portion 102, the servo portion 106, and the injection portion 108, respectively. It should be appreciated that the drain valve 132 and metering valve 116 may be designed as a 4-way, 2-position valve connected to both the line 125 feeding the fluid to the metering valve 116 from the accumulator 114 and the line 130 from the metering valve 116 to the injection portion 108, as well as to a drain line 128 coming into and out of the drain valve 132. It should be appreciated that the same servo-valve 122 that is thermally separated from the metering valve 116 as described above may be used with this combined metering and drain valve. It should also be appreciated that the drain valve 132 specifically may be a ball valve or any other type of valve known in the art that can be actuated by a corresponding metering valve.

The metering portion 104 also includes a drain system that provides various piping arrangements and fluid connections for discharge of the fluid from the system as needed, including, for example, during periods when no fluid is being passed through the metering valve 116. During such times and in certain embodiments, fluid may thermally expand with the injection portion 108 and in piping that feeds the fluid to the injection portion 108 thereby increasing the pressure within the injection portion 108, ultimately overcoming the pressure required for injection, and causing an unintended or uncontrolled injection of fluid. The drain system includes the drain line 128 that extends from an injection feed line 130 that carries the fluid from the metering valve 116 to the injection portion 108, through a restrictor or discharge throttle 118, through a drain or discharge valve 132 that is integrated or connected to the metering valve 116 as described further below, through an pressure control valve 134 positioned between the drain valve 132 and the point at which the fluid connection from the servo-valve 122 is made, and another pressure control valve 136 between the point at which the fluid connection from the servo-valve 122 is made and the fluid source 109, and ultimately back to the fluid source 109. It should be appreciated that the drain line 128 may have four different portions, including the portion 128a extending from the injection feed line 130 to the discharge throttle 118, the portion 128b extending from the discharge throttle 118 to the drain valve 132, the portion 128c extending from the drain valve to the pressure control valve 134, and the portion 128d extending from the pressure control valve 134 ultimately back to the fluid source 109. It should be appreciated that each of these different portions or section of the drain line 128a, 128b, 128c, 128d may have different pressure levels depending on the position of the drain valve 132 to provide proper operation of the drain system. It should be appreciated that the discharge throttle 118 is used to adjust the flow of the fluid from the line 130 back to the drain valve 132.

A line 133 is connected to a corresponding control portion of the drain valve 132 and to the drain line 128 and is a pressure loaded area providing pressure to the drain valve stem. A line 135 is also connected to this control portion of the drain valve 132 and to the line 125 that is also a pressure loaded area and provides the system pressure from the accumulator 114 to the control portion of the drain valve 132. When the metering valve 116 is in an open position, as described further in connection with FIG. 2, the drain valve 132 is in a closed position. Accordingly, in conjunction with the metering valve 116 being in an open position, the system pressure provided from the accumulator 114 via the line 135 will serve to keep the drain valve 132 in a closed position in conjunction with the spring force in the drain valve 132. Similarly, when the water is not being fed to the metering portion 104 when the system is not in operation, the drain valve 132 will be in an open position. As described below, the metering valve 116 will act to open the drain valve 132 against the pressure provided in the line 135 and the spring force pressure, and water in the control portion of the drain valve 132 will drain from the control portion through the line 128b.

The injection portion 108 includes an injection valve 126 that delivers the fluid to an injection nozzle and associated equipment. The associated equipment is basically the same as that of the metering portion 104 that provides for a fluid connection between the metering valve 116 and the injection valve 126, as well as that piping that provides for the fluid discharge through the injection nozzle. It should be appreciated that in some embodiments, the injection valve 126 and injection nozzle are designed to be held in a closed position based upon the pressure in the line into which injection is being made. For example, if the injection is into a steam gas stream, the pressure of the gas stream is used to maintain the closed position of the injection valve 126 and nozzle.

In general operation, a desired fluid stored or held at the source 109 is metered and delivered to an endpoint, in this case, an injection device, which injects or delivers the fluid into another fluid. For example, water may be used as the fluid that is metered to an injection nozzle that delivers the water to a gas stream to attemperate the gas stream, such as a superheated steam gas stream from a power plant being used for a heat-recovery steam generator. It should be appreciated, however, that the fluid used may be any fluid desired to be metered and that it may be delivered to any endpoint or for any purpose.

With reference to FIG. 1, the fluid is water held at the source 109 or water supply reservoir. Water is pumped by the pump 110, which pulls the water through the filter 112 to remove any undesirable components, such as particles, from the water and delivers the water to the accumulator 114, which holds a given volume of water. Water is ultimately passed from the accumulator 114 using the pressure generated by the pump 110 when the metering portion permits the water to flow. The pressure regulating valve 115 is used to maintain a desired pressure in the accumulator 114 so that the water is available for metering upon demand. Accordingly, the pump 110 provides a desired fluid pressure from the source portion 102 to the system. It should be appreciated that the pump 110 provides pressure to the system for both delivering the water to the desired endpoint and for providing pressure for purposes of controlling and operating the various valves associated with the overall system. In some embodiments, the water pressure from the source portion 102 may be approximately 200-215 bar.

The metering portion 104 is activated by the servo portion or servo-valve 106, which when activated or energized is put into an open position. As a result, the metering portion 104 will open to allow water to pass from the accumulator 114 through the line 125, to and through the metering valve 116, and to the injection portion 108 along line 130, which feds the fluid to the invention portion 108 from the metering valve 116. The servo portion 106 may be activated as predetermined and by any means know in the art, including for example the desired amount of attemperation or fluid to be injected into a given stream. The means of activation will depend upon the design of the servo-valve 122, which is described in more detail below in connection with FIG. 2. In some embodiments, the servo-valve 122 may be a solenoid-controlled or piezoelectrically-controlled servo-hydraulic valve.

More specifically, once activated, the servo-valve 122, which may be, as shown, a 1-way, 2-position valve, opens to permit the flow of water from a control portion of the metering valve 116 via a line or passageway 117 through the servo-valve 122 and ultimately back to the source 109. As a result of removing water from the control portion of the metering valve 116, the metering valve 116 opens to allow the main water flow, or the water to be injected, to pass from the accumulator 114 through the metering valve 116 to the injection portion 108. It should be appreciated that when the servo-valve 122 is open, the pressure in the control portion of the metering valve 116 will be reduced. Further, the higher pressure of the water from the accumulator will also aid in opening the metering valve 116 as it will push against the spring force inside the metering valve 116. In some embodiments, the pressure provided by the source portion 102 may be approximately 200-215 bar and the pressure of the stream into which the water is being injected may be approximately 165 bar. In this case, when the servo-valve 122 is open, the pressure in the control portion of the metering valve 116 may be reduced to approximately 100 bar. Accordingly, the higher pressure from the source portion 102, being at approximately 200-215 bar, will push the metering valve 116 against the spring force to open the metering valve 116. It should be appreciated that the water passing from the control portion of the metering valve 116 to the servo-valve 122 when it is open, passes via a restrictor 124, such as an A-throttle, which throttles the flow of water from the control portion of the metering valve 116 through the servo-valve 122 when the servo-valve 122 is in the open position. Water from the servo-valve 122 can be passed to a line 137 that ultimately connects to the source 109 via a pressure control valve 136. It should be appreciated that the pressure downstream of the pressure control valve 136 is lower than the pressure provided by the source portion 102 to the system. For example, in those embodiments in which the pressure provided by the source portion 102 to the system is approximately 200-215 bar, the pressure downstream of the pressure control valve 136 may be approximately 80-100 bar. In some embodiments, the pressure difference between the source portion 102 and the pressure control valve 136 is approximately 50 bar and may be approximately 50-60 bar. It should be appreciated that a certain back-pressure is desirable, as opposed to a zero pressure, at the pressure control valve 136 to avoid cavitation in the metering valve 116 as well as in the servo-valve 122. In some embodiments, such as when the system 100 is used for attemperating of a steam gas stream, such as a superheated steam gas stream from a power plant being used for a heat-recovery steam generator, the steam pressure of the gas stream into which the fluid is being injected may be approximately 165 bar. In this case, the accumulator pressure may be controlled to approximately 215 bar and the back pressure on the drain line 128*d* would be approximately 80 bar. It should be appreciated that upstream of the pressure control valve 134, the pressure in the drain line 128*c* would be slightly below the stream pressure. It should be appreciated, however, that these pressures may vary.

It should also be appreciated that the water flow from the accumulator 114 to the control side of the metering valve 116 is controlled or throttled by another restrictor 120, such as a Z-throttle. When the servo-valve 122 is in an open position, this restrictor 120 reduces the water supply pressure from the accumulator 114 such that the water on the control side of the metering valve 116 can pass through the servo-valve 122 when it is activated and open, causing the metering valve 116 to open. It should be appreciated that in some embodiments, this is accomplished by the restrictor 120 having a smaller orifice than that of the restrictor 124 controlling the flow from the servo-valve 122.

When the servo-valve 122 is closed after having been in an open position, water from the accumulator 114 will fill the control portion of the metering valve 116 by passing fluid through the restrictor 120, thereby closing the metering valve 116 in conjunction with the spring force. Specifically, once the servo-valve 122 is no longer activated or is de-energized, for example after the desired time period for injecting the water by metering the water through the metering valve 116 into the injection portion 108, the servo-valve 122 will move to a closed position via a spring force. As a result, water from the accumulator 114 will pass through the restriction 120 and into the control portion of the metering valve 116, thereby closing the metering valve 116, which then stops the flow of water from the accumulator 114 through the metering valve 116 to the injection portion 108.

As described, when the servo-valve 122 is energized and the metering valve 116 is in an open position, water passes through the metering valve 116 to the injection portion 108. The injection portion 108 includes the injection valve 126 and an injection nozzle. It should be appreciated that during operation, the injection valve 126 may be held in a closed position by the pressure from the stream into which injection is being made. For example, if the injection is into a steam gas stream, the pressure of the gas stream is used to maintain the closed position of the injection valve 126 and nozzle. In addition, a spring force biased to close the injection nozzle may also be used. Once the metering valve 116 opens, the pressure on the injection valve 126 will be greater than that in the stream into which injection is being made, such that the pressure of the water also overcomes the spring force, thereby passing water through the injection nozzle into the stream. In some embodiments, the Similarly, once the metering valve 112 is in a closed position, the pressure from the stream into which injection is being made will be greater than that in the injection portion 108 and close the injection valve 126.

As noted above, during certain times and in certain embodiments when the water is not passing through the metering valve 116, or when the injection valve is closed, the water may thermally expand within certain areas of the injection portion 108, including, for example, piping that feeds the water to the injection portion 108. This may occur, for example, by heat being transferred from the gas stream into which the water is being injected, such as from a steam stream, to the injection device and the line that feeds the water to the injection device, thereby increasing the pressure in the line feeding the injection device. As a result, the pressure within the injection portion 108 may increase to the point of overcoming the pressure required for injection or overcoming the pressure from the stream into which injection is being made and causing an unintended or uncontrolled injection of water into the stream. Accordingly, the drain system operates to reduce or eliminate such unintended injections of the water.

As described above and as further described below in connection with FIG. 2, the drain or discharge valve 132 is integrated with the metering valve 116 such that the metering valve 116 actuates the drain valve 132. Accordingly, when the metering valve 116 is closed, it actuates the opening of the drain valve 132, which allows the drain path to be open. Accordingly, water in the line 130 feeding the injection portion 108, can drain by passing from this line 130 through the discharge throttle 118, through the line 128 connecting the throttle 118 to the drain valve 132, through the drain valve 132, through the pressure control valves 134, 136, and ultimately back to the sour 109. Similarly, when the metering valve 116 is open it causes the drain valve 132 to close. The metering valve 116 can actuate the drain valve 132 by a pin that engages a ball in the drain valve 132 that controls flow through the drain valve 132, as described further in connection with FIG. 2. This allows the pressure in the line 130 from the main valve 116 to the throttle 134 to be adjusted such that the pressure in the line 130 is less than the pressure in line into which the water is being injected. Accordingly, this provides the ability to minimize or prevent unintended injections of water. In other words, the ability for the water to thermally expand in the line 130 feeding the injection portion 108 or in any components within the injection portion 108 or in any line downstream of the metering valve 116 is reduced or eliminated. By allowing the drain path to remain open, no sufficient pressure can build up that would otherwise cause an unintended or uncontrolled injection of water. The drain path pressure can be controlled using the throttle or pressure control valve 134 positioned upstream of the point at which the water connection from the servo-valve 122 is made. An optional pressure control valve 136 downstream of the point at which the water connection from the servo-valve 122 is made may also be used and adjusted as necessary to control the pressure in the line 130. Accordingly, to the extent that any pressure increase occurs due to expansion of the fluid or water, such will be drained from the system rather than unintendedly injected. In some embodiments, such as use of the injection system for attemperating a steam gas stream, the pressure control valve may be set slightly below the steam pressure of the gas stream. In some embodiments, the pressure in the steam gas stream may be approximately 165 bar, in which case the desired pressure in the line 130 feeding the injection device or nozzle may be approximately 160 bar. Accordingly, in some embodiments, the desired pressure difference may be approximately 5 bar to avoid or minimize unintended injections. It should be appreciated that the pressure in the line 130 should be controlled to a pressure that is less than the pressure in the line into which the fluid is being injected. Accordingly, control of this pressure is done, as noted above, using the pressure control valve 134, which can be controlled manually or by other means known in the art, such as hydraulic control.

In some embodiments, the integrated metering and drain valves 116, 132 are constructed such that the metering valve 116 in moving from a closed to open position only needs to travel approximately 10-25% of its stroke for the corresponding drain valve 132 to be completely closed. The ratio of each valve's percentage of stroke traveled can be determined as needed during construction of the integrated valves 116, 132. It should also be appreciated that the actuation of the drain valve 132 based upon the opening and closing of the metering valve 116 avoids the drain valve 132 and corresponding drain path from being open continuously. This effectively reduces drainage losses, as such would only occur when the drain valve 132 is in an open position compared to having a continuously open drainage path.

As discussed above, the servo-valve 122 may be thermally separated or decoupled from the metering valve 116. Accordingly, during operation, tubing or piping can be used for the line 117 that connects the control portion of the metering valve 116 to the servo-valve 122 to transverse the spatial separation between the two valves and to transfer the water from a control portion of the metering valve 116 to the servo-valve 122, thereby allowing the metering valve 116 to open.

It should be appreciated, as described above and in more detail in connection with FIG. 2, that based upon the spatial separation of the metering valve 116 and the servo-valve 122, a separate cooling system may be used to further cool the servo-valve 122 and its actuator. This cooling system may include a water or air cooling system and can be separately controlled based upon the temperature of the servo-valve 122.

Figure 2A:
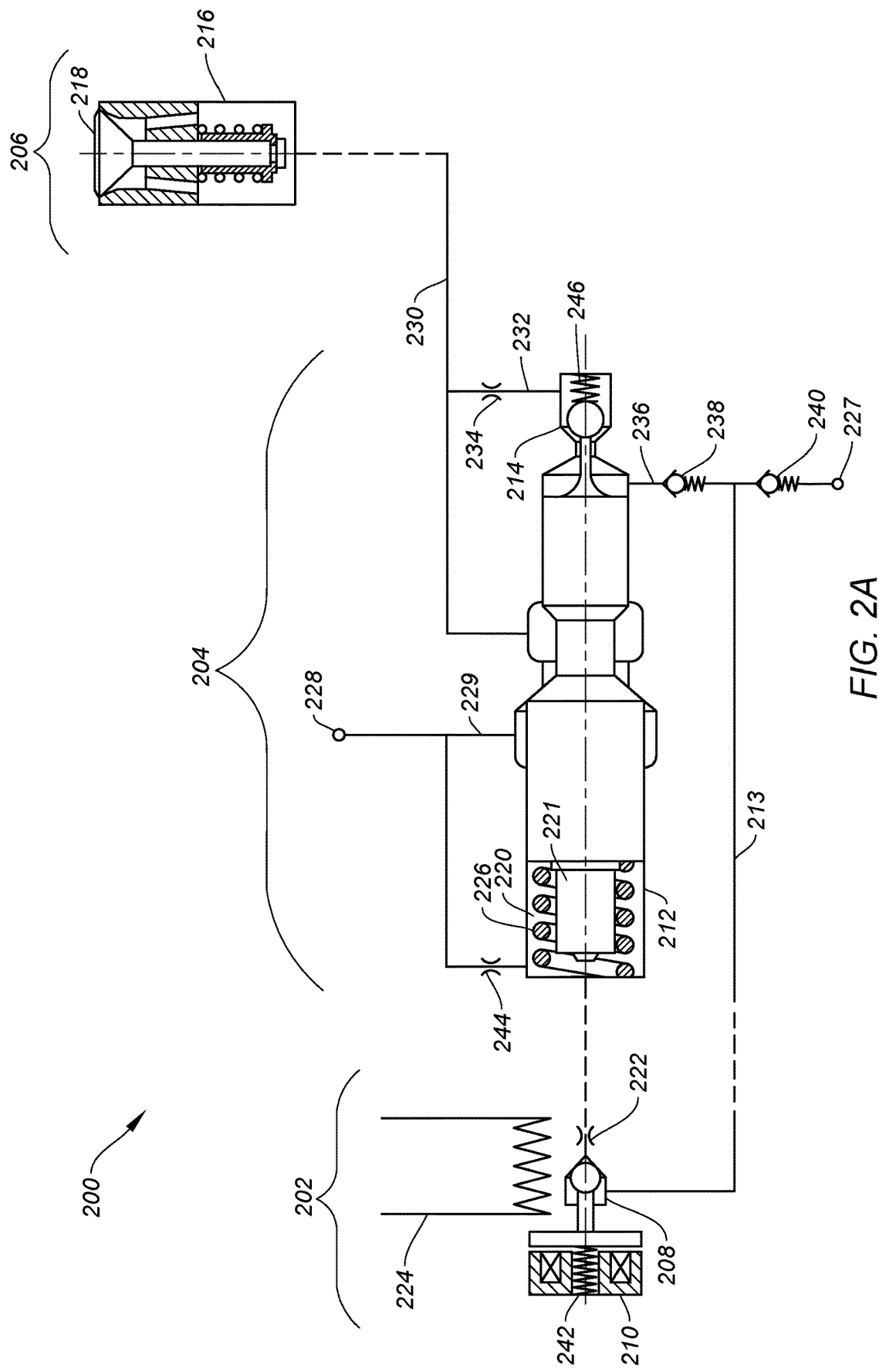
FIG. 2A illustrates a fluid injection system for injecting a fluid according to one embodiment of the present invention.

FIG. 2A illustrates a fluid injection system for injecting a fluid according to one embodiment of the present invention. The fluid injection system 200 illustrates a fluid injection system that implements the flow schematic should in FIG. 1. The fluid injection system 200 includes a servo portion 202, a metering portion 204, and an injection portion 206. The servo portion 202 includes a servo-valve 208 and a corresponding servo actuator 210, which may be, for example, a solenoid or piezoelectric actuator. The metering portion 204 includes a metering valve 212, which is connected to a drain valve 214. The injection portion 206 includes an injection valve 216 and an injection nozzle 218. It should be appreciated that each portion is fluidly connected to one or more of the other portions as described in more detail below.

The servo-valve 208 is fluidly connected by a line 211 to the metering portion 204, specifically to a control space or chamber 220 within the metering valve 212. A restrictor 222, such as an A-throttle, is used on line 211 to throttle the fluid flow between the servo-valve 208 and the control space 220 within the metering valve 212. The servo-valve 208 is also fluidly connected to a line 221 that passes fluid from the servo-valve 208 to the source of fluid.

It should be appreciated that the servo portion 202 and, in particular, the servo actuator 210 and the servo-valve 208 are spaced apart from the metering portion 204. As described above, this spatial separation thermally decouples the servo portion 202, specifically the servo actuator 210, from heat that may be generated by the fluid passing through the metering portion 204 or the metering valve 212 itself. As also described above, in some embodiments, the servo actuator 210 should be operated at or below a given maximum temperature for best performance. By separating the servo actuator 210 from the metering portion 204, any heat that would otherwise be transferred to the servo portion 202 or the servo actuator 210 can be reduced or eliminated, thereby allowing the servo actuator 210 to operate at or below its maximum operating temperature, resulting in better performance, reliability, and life span of the servo actuator 210.

As described above, the distance between the servo portion 202 and the metering portion 204 needed to either control the temperature of the servo actuator 210 or to minimize or avoid heat transfer from the fluid passing through the metering valve 212 to the servo actuator 210 can be determined based upon the maximum temperature desired for the servo portion 202 and its related components, including the servo-valve 208 and the servo actuator 210, and the environment in which the overall injection system 200 will be used. Additional factors in determining this distance include the amount of heat transfer from the fluid to the servo portion 202, the operating temperature of the fluid, materials of construction and heat transfer properties of the related valves, and temperature of the surrounding environment. It should be appreciated that in some embodiments, the actuator for the servo actuator 210 should be at a temperature of 100° C. or less and in some embodiments at a temperature of 80° C. or less for proper functioning. Accordingly, in some embodiments, the distance between the servo actuator 210 and the metering valve 212 may range from approximately 50-1000 mm. In some embodiments, the distance between the servo-valve 208 and the metering valve 212 may range from approximately 200-500 mm.

Nonetheless, it should be appreciated that regardless of the distance, the metering valve and servo-valve may still be manufactured as a single unit that accommodates the desired distance between the two valves.

It should be appreciated that in some embodiments, additional cooling of the servo portion 202 and the servo actuator 210 may be desirable. In this case, a separate cooling system 224 may be used. This cooling system may be an air or water cooled system that is operated to provide the desired operating temperature for the servo actuator 210 and can be controlled based upon the desired, predetermined temperature setpoint.

The metering portion 204 includes the metering valve 212, which has a control space 220 and a spring 226 biased to placing the metering valve 212 in the closed position (i.e., forcing the metering valve stem 221 to the right in FIG. 2). The metering valve 212 is fluidly connected to the supply source 228 via a line 229 that provides the fluid to be metered at a given pressure. The metering valve 212 is also fluidly connected to the injection portion 206 by a line 230. It should be appreciated that the supply source 228 is the pressurized water from the accumulator, such as that shown in connection with FIG. 1, and in some cases would have a pressure of approximately 215 bar.

Attached to the end of the metering valve where the fluid is discharged from the metering valve 212 to the injection portion 206 is the drain valve 214. The drain valve 214 is fluidly connected to a discharge line 232 that is fluidly connected to the line 230 that feeds the injection portion 206. The discharge line 232 passes fluid discharge from the injection portion 206 and other portions to the drain valve 214. A discharge throttle 234 is located along the discharge line 232 between the drain valve 214 and the line 230 that feeds the injection portion 206 to control the flow from the line 230 to the discharge line 232 during periods when the system is not injecting fluid and the metering valve 212 is closed. As shown, the discharge valve 214 may be a ball valve. The discharge side of the drain valve 214 is fluidly connected to another line 236 that fluidly connects to a pressure control valve 238 positioned upstream of a point at which the fluid connection from the servo-valve 208, through a line 221, is made to this same line 236. Another pressure control valve 240 is positioned on this same line 236 downstream of this point at which the fluid connection from the servo-valve 208 is made. This line 236 ultimately passes back to the fluid source 227 or water supply reservoir as shown in connection with FIG. 1.

It should be appreciated that the drain valve 214 and metering valve 212 may be designed as a 4-way, 2-position valve connected to both the line 229 feeding the fluid to the metering valve 212 from the source 228 and the line 230 from the metering valve 212 that feeds the injection portion 206, as well as the lines 232, 236 coming into and out of the drain valve 214. It should be appreciated that the same servo portion 202 thermally separated from the metering valve 212 as described above may be used with this combined metering and drain valve.

The injection portion 206 includes an injection valve 216 that delivers the fluid to an injection nozzle 218. It should be appreciated that in some embodiments, the injection valve 124 and injection nozzle are designed to be held in a closed position based upon the pressure in the line into which injection is being made. For example, if the injection is into a steam gas stream, the pressure of the gas stream is used to maintain the closed position of the injection valve 216 and nozzle 218.

In general operation, the fluid injection system 200 is used to meter a given fluid into a given stream. For example, in some embodiments, water may be used as the fluid that is metered to an injection nozzle that delivers the water to a gas stream to attemperate the gas stream, such as a superheated steam gas stream from a power plant being used for a heat-recovery steam generator. It should be appreciated, however, that the fluid used may be any fluid desired to be metered and that it may be delivered to any endpoint or for any purpose.

The system 200 begins metering fluid once the servo actuator 210 is activated or energized. Upon activation, the servo actuator 210 will cause the servo-valve 208 to move to an open position. In this open position, fluid being held in the control space 220 of the metering valve 212 passes from the control space 220 through the line 211, which provides for the spatial separation of the servo portion 202 from the metering portion 204, and the restrictor 222. The fluid passes through the servo-valve 208 and into the line 213 that connects to the discharge line 236 from the drain valve 214 and ultimately to the source 228.

Once the fluid is passed from the control space 220, the metering valve 214 is able to move to an open position against the spring 226, and the fluid is able to pass through the metering valve 214 to the line 230 that provides the fluid to the injection portion 206. As described above, the injection valve 216 prevents the flow of fluid through the injection nozzle 218 based on the pressure from the stream into which the fluid is being injected. Once the fluid passes through the metering valve 215, that pressure is overcome by the pressure of the fluid in the injection portion 206, resulting in the injection valve 216 being moved to an open position and allowing the fluid to pass through the injection nozzle 218 into the stream.

Once the desired amount of fluid has been injected, the associated control system for the fluid injection system 200 will de-energize the servo actuator 210. Once the servo actuator 210 is de-energized, a spring will force the servo-valve 208 into a closed position, thus preventing the flow of water from the control space 220 in the metering valve 212. Fluid from the source 228 will flow via a restrictor 244, such as a Z-throttle, to fill the control space 220 with fluid. Once filled, and along with the force of the spring 226, the metering valve 212 will be moved to a closed position, thereby preventing the flow of the fluid through the metering valve 212.

The closing of the metering valve 212 concurrently actuates the opening of the connected drain valve 214. Fluid pressure builds inside of the metering valve 212 and acts against a spring 246 inside the drain valve 214 to move it to an open position. This allows for a fluid path to be open from the injection portion 206 through the discharge throttle 234, through the drain valve 214 and through the optional pressure control valve 238 and the second pressure control valve 240. Accordingly, to the extent that any fluid has expanded near the injection portion 206, such can be de-pressurized and pass through this drain path to avoid any unintended injection of fluid. Similarly, it should be appreciated that upon moving the metering valve 212 to an open position, such will actuate the drain valve 214 and move it to a closed position.

Figure 2B:
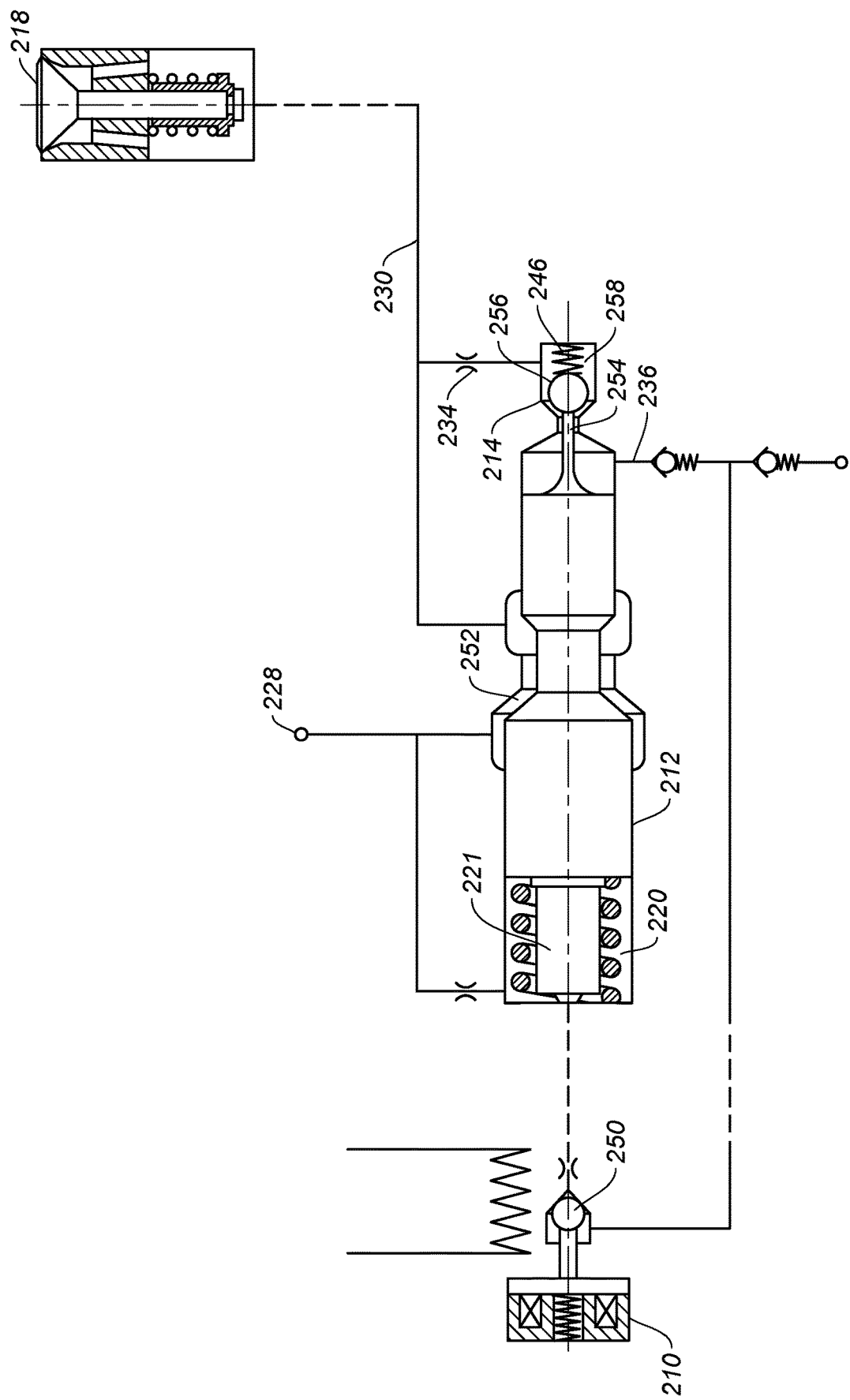
FIG. 2B illustrates the system of FIG. 2A when the metering valve is in an open position, according to one embodiment of the present invention.

FIG. 2B illustrates the system of FIG. 2A when the metering valve is in an open position, according to one embodiment of the present invention. When the metering valve 212 is in an open position, the metering valve 212 or valve stem 221 is moved to the left in FIG. 2B. The metering valve 212 is moved to this open position when the servo-valve 208 is actuated, in which case the ball 250 in the servo-valve is pulled to the left in FIG. 2B by the servo actuator 210, thereby moving the ball 250 from its seat and allowing fluid to pass from the control space 220 in the metering valve 212. This in turn opens a space around the valve seat 252 of the metering valve 212 to allow the fluid to pass from the source 228, through the valve 212, and out to the injection feed line 230. Accordingly, the fluid pressure passing from the metering valve 212 to the injection portion 206 is sufficient to overcome the pressure in the stream into which the fluid is being injected to open the injection valve 218 (shown in an open position) and allow the injection of fluid. Concurrently, the discharge valve 214 is placed in a closed position. In this case, a pin 254 connected to the metering valve 212 is moved with the metering valve stem 221 to the left in FIG. 2B. Accordingly, the pin 254 is moved away from the ball 256 in the discharge valve 214, which allows the ball 256 to be pushed against its seat by the water pressure provided to the control space 258 and the biased spring force 246. Accordingly, the ball 256 once forced into its seat prevents the flow of water through the discharge valve 214.

Figure 2C:
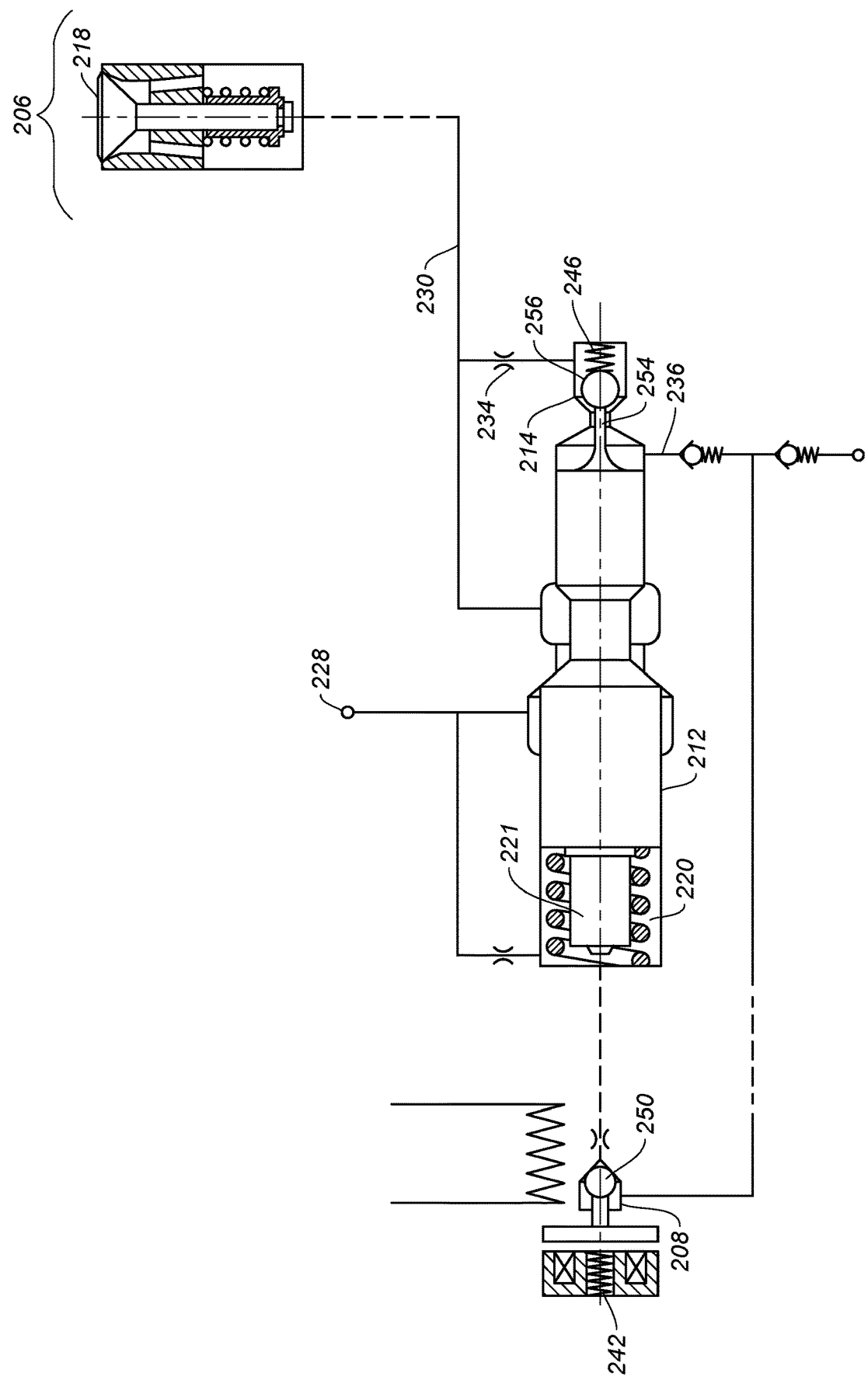
FIG. 2C illustrates the system of FIG. 2A when the metering valve is in a closed position, according to one embodiment of the present invention.

FIG. 2C illustrates the system of FIG. 2A when the metering valve is in a closed position, according to one embodiment of the present invention. As shown, the metering valve 212 and valve stem 221 are in a closed position (i.e., moved to the right in FIG. 2C). The metering valve 212 is moved to this closed position when the servo-valve 208 is no longer being actuated, in which case the ball 250 in the servo-valve is pushed to the right in FIG. 2B by the servo actuator 210, thereby moving the ball 250 to its seat and preventing fluid passing from the control space 220 in the metering valve 212. In turn, fluid from the source 228 fills the control space 220 and with the biased spring force 242, the ball 250 is moved to its seat. This in turn closes the space around the valve seat 252 of the metering valve 212 to prevent the fluid passing from the source 228, through the valve 212, and out to the injection feed line 230. Accordingly, the fluid pressure passing from the metering valve 212 to the injection portion 206 is now less than the pressure in the stream into which the fluid was being injected and closes the injection valve 218 (shown in a closed position). Concurrently, the discharge valve 214 is placed in an open position. In this case, the pin 254 connected to the metering valve 212 is moved with the metering valve stem 221 to the right in FIG. 2C. Accordingly, the pin 254 contacts and pushes the ball 256 in the discharge valve 214, which moves the ball 256 away from its seat against the water pressure provided to the control space 258 and the biased spring force 246. Accordingly, the ball 256 once moved away from its seat allows the flow of water through the discharge valve 214 that may have accumulated in the line 230 feeding the injection portion 206.

It should be appreciated that the pin 254 is sized such that the metering valve 212 must travel a greater percentage of its stroke to engage the ball 256 of the drain valve 214. As shown in FIG. 2B, when the metering valve 212 is in an open position (moved to the left in FIG. 2B), there is a gap between the end of the pin 254 and the ball 256. Accordingly, the metering valve 212 when moving to a closed position (moving from the left to the right in FIG. 2B), it must move a certain distance before the pin 254 actually engages the ball 256. Alternatively, when the metering valve 212 is moving to an open position (moving to the left in FIG. 2B), the pin 254 disengages from the ball 256 well before the metering valve 212 is fully opened. Therefore, before the metering valve 212 is fully opened, the discharge valve 214 has been completely closed, thereby preventing the loss of any fluid when the metering valve 212 opens.

Figure 3B:
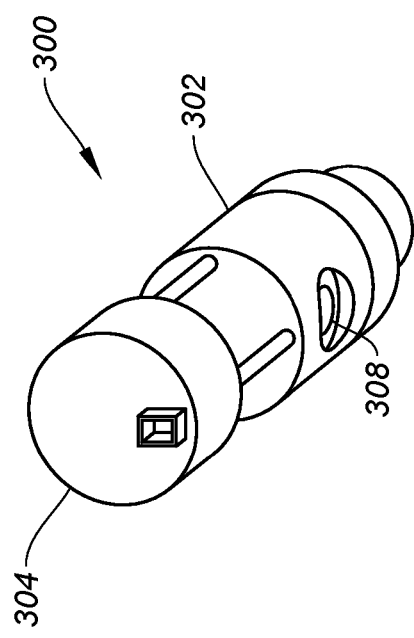
FIG. 3B is another perspective view of the combined metering valve and servo-valve of FIG. 3A according to one embodiment of the invention.
Figure 3A:
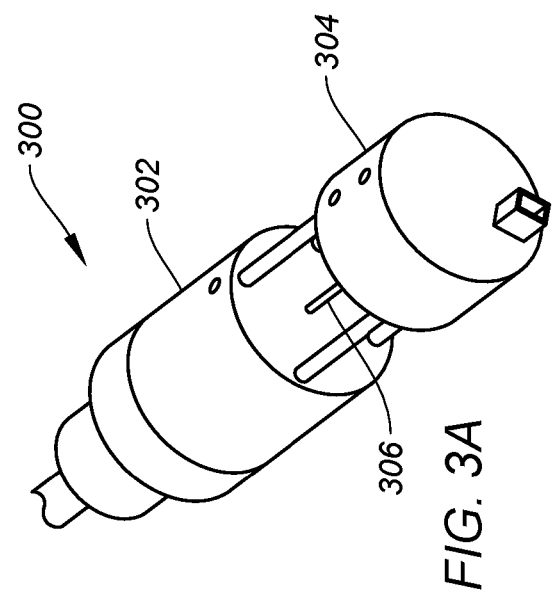
FIG. 3A is a perspective view of the combined metering valve and servo-valve according to one embodiment of the invention.

FIG. 3A is a perspective view of the combined metering valve and servo-valve according to one embodiment of the invention. The system 300 includes a metering valve 302 and a servo-valve 304. As described above, the metering valve 302 is thermally isolated from the servo-valve 304 and a tube 306 is used to fluidly connect the two for control purposes. It should be appreciated that the line to the drain is not shown in FIG. 3A. It should be appreciated that the system 300 shown is an example of an embodiment in which the system 300 is constructed as a single unit but with the metering valve 302 and the servo-valve 304 being in separate housings. This embodiment illustrates an example of how the servo-valve 304 can be thermally separated from the metering valve 302 by using a given physical distance or separation between the two.

FIG. 3B is another perspective view of the combined metering valve and servo-valve of FIG. 3A according to one embodiment of the invention. This perspective of the system 300 illustrates the fluid inlet port 308 for passing a fluid from its source to the metering valve 302.

Figure 4:
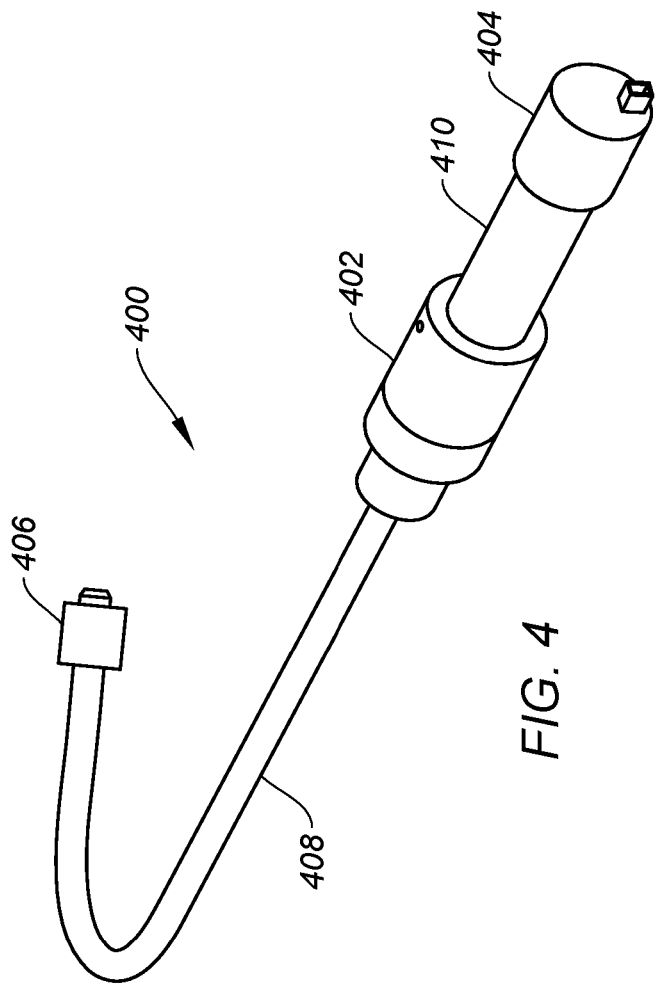
FIG. 4 is a perspective view of one embodiment of a fluid injection system of the present invention for use according to one embodiment of the present invention.

FIG. 4 is a perspective view of one embodiment of a system of the present invention for use according to one embodiment of the present invention. As shown, the system 400 includes a metering portion or valve 402, a servo portion or valve 404, and an injection portion 406. A line 408 is used to pass the fluid from the metering valve 402 to the injection portion 406, which would be attached to a duct or pipe carrying the stream into which injection of the fluid is desired. A housing 410 is used to connect the metering portion 402 and the servo portion 404 and surrounds any structural elements connecting the two, as well as any fluid line connecting the two for control purposes.

Figure 5:
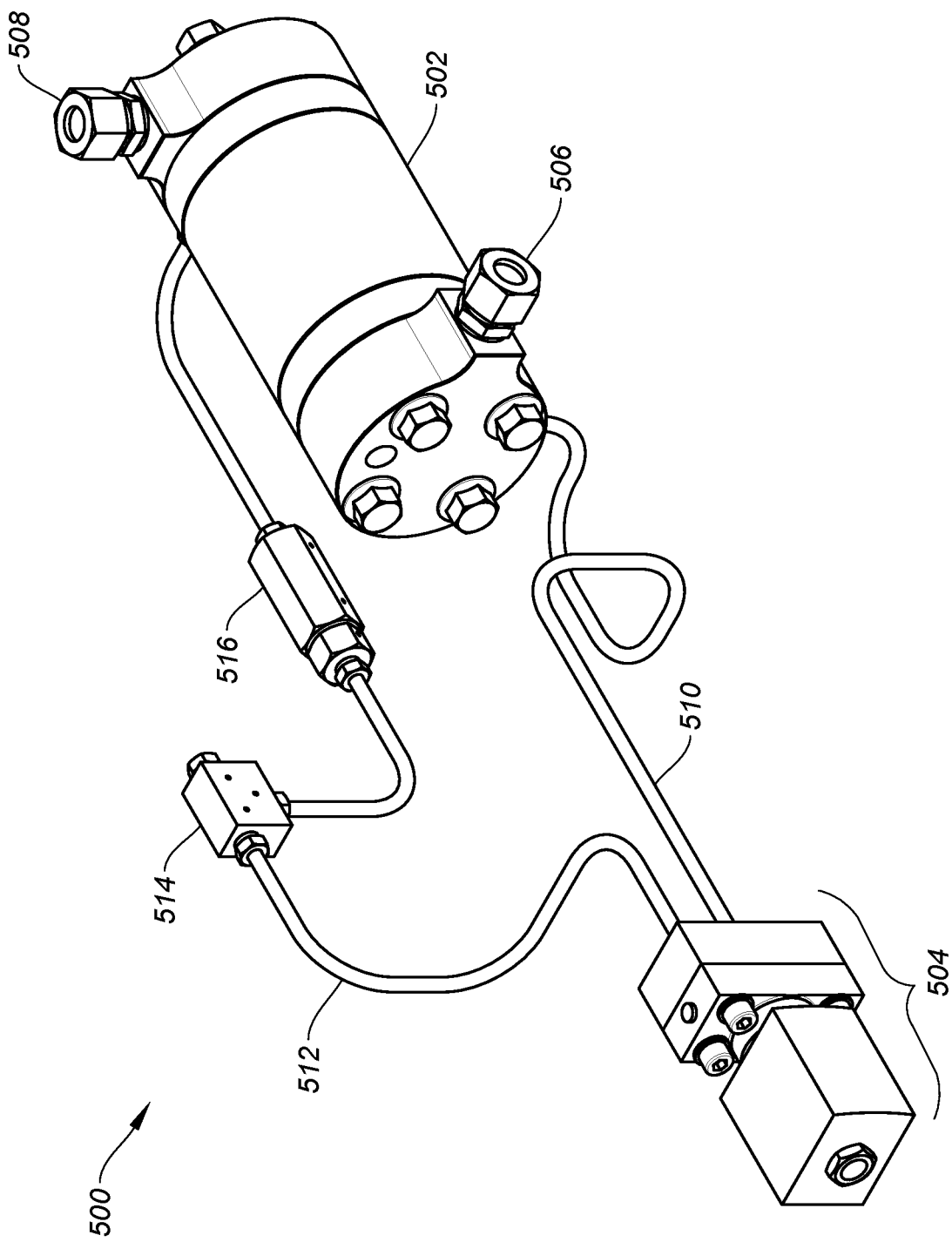
FIG. 5 is a perspective view of another embodiment of a fluid injection system of the present invention for use according to one embodiment of the present invention.

FIG. 5 is a perspective view of another embodiment of a fluid injection system of the present invention for use according to one embodiment of the present invention. The fluid injection system 500 includes a metering valve 502 and a servo-valve 504. A water supply line (not shown) providing water to the system 500 would be connected to the water supply inlet port 506 on the metering valve 502. Water from the metering valve 502 would be discharged from a discharge port 508 and passed to a desired point of use, such as an injection valve (not shown). The metering valve 502 is controlled by the servo-valve 504, which is fluidly connected to the control chamber of the metering valve 502 through a line 510. The servo-valve 504 also has a discharge line 512 that passes water from the control chamber of the metering valve 502 to a T-piece 514. The housing for the metering valve 502 also houses a drain or discharge valve that is controlled by the metering valve 502 such that when the metering valve is closed, the discharge valve is opened to allow for discharge of water from the line connected to the discharge port 508 to avoid unintended injection of water to the desired injection point or point of use. Water passing through the discharge valve passes through a back-pressure valve 516 to control the discharge, which is joined with the discharge line 512 at the T-piece 514. Both discharge lines joined at the T-piece 514 and then discharged from the system. Just as an example, in one embodiment, the metering valve housing may have a diameter of approximately 90 mm and a length of approximately 210 mm.

As described above, one feature of the fluid injection system 500 is the provision of distance between the servo-valve 504 and the metering valve 502. This distance is provided to allow the servo-valve 504 to be operated at a lower temperature than the metering valve 502. Such a lower temperature at the servo-valve 504 provides for better operation of the servo-valve 504. For example, in some uses of the fluid injection system 500, such as injecting water into a superheated steam gas stream from a power plant, the temperature of the water injected may be approximately 160° C. and thus the metering valve 502 may be at approximately this same temperature. However, the temperature of the actuator portion of the servo-valve should be maintained below about 100° C. and in some embodiments, below about 80° C. for proper functioning. Therefore, the physical separation of the metering valve 502 from the servo-valve 504 minimizes heat transfer from the water and the metering valve 502 to the servo-valve 504 and specifically the solenoid of the servo-valve 504. In the example of injecting water into a superheated steam stream with a water temperature of approximately 160° C. distances of approximately 500-1500 mm, approximately 500-1000 mm, approximately 500 mm, or not below 500 mm can be used to provide a temperature at the servo-valve 504 of approximately 80° C. Of course, depending upon ambient conditions and exact water temperatures, this distance can be altered to meet the specific operating conditions desired. It should be appreciated that in this embodiment, the physical separation between the metering valve 502 and the servo-valve 504 is made possible through the use of tubes that fluidly connect the metering valve 502 and the servo-valve 504, specifically the control pressure line 510 and the low pressure drain line 512, whose length can be altered as desired. It should be appreciated that the fluid injection system 500 is partly distinguished from that shown in FIGS. 3A and 3B based upon the provision of a greater distance between the respective metering valves and the servo-valves, although it should also be appreciated that in either embodiment, the desired distance can be provided by adjusting the length of the tubes used to fluidly connect the respective metering valves and the servo-valves. In some cases additional cooling of the servo-valve 504 can be used to further reduce the operating temperature of the servo-valve 504.

Figure 6:
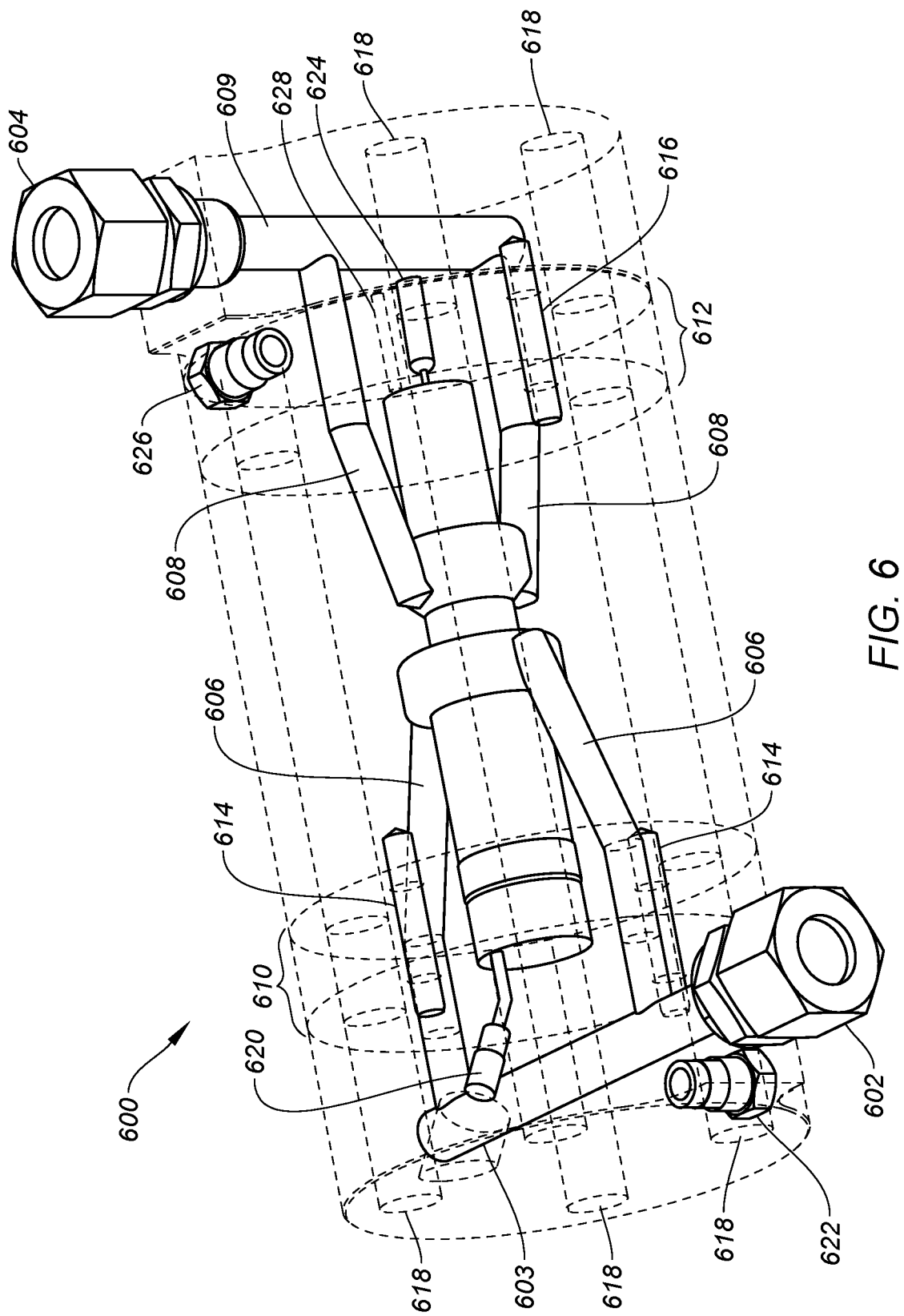
FIG. 6 is a perspective, transparent view of another embodiment of the metering valve according to one embodiment of the present invention.

FIG. 6 is a perspective, transparent view of another embodiment of the metering valve according to one embodiment of the present invention. The metering valve 600 is similar to that described in connection with FIGS. 2A, 2B, and 2C in that it is a combined metering valve with a thermally decoupled servo-valve for controlling the metering valve and a discharge valve. Additionally, this embodiment includes changeable throttle plates that provide throttles or orifices to control the flow of the fluid into and out of the control chamber of the metering valve and through the discharge valve. As shown, the metering valve 600 has a water inlet port 602 to receive water from the water supply and a water discharge port 604 to feed the water from the metering valve 600 to its end use, such as a water injection nozzle (not shown). Water passes through the inlet port 602 into a common inlet tube 603 that distributes the water to two supply tubes or bores 606 that feed the water to the space in the metering valve 600 created when the metering valve 600 is in an open position. The water then flows from that space when the metering valve 600 is open through two corresponding discharge tubes or bores 608 that pass the water to a common discharge tube 609 that passes the water through the discharge port 604 and ultimately to its end use, such as an injection nozzle (not shown). It should be appreciated that as described further below, the two supply tubes 606 that pass water from the inlet port 602 are in a plane that is offset by 90° from a second plane in which the two discharge tubes 608 that pass water to the common discharge tube 609 and through the outlet port 604.

It should also be appreciated that additional bores, beyond the two sets of bores 606, 608 as shown, on either the inlet side or discharge side of the metering valve 600 may be used. For example, more than two bores may be used on the outlet side of the metering valve 600 as the discharge bores that pass fluid from the metering valve 600 to a common discharge tube 609, such as three bores, four bores, or more. It should also be appreciated that these multiple bores may have different sizes or cross-sectional areas or a different arrangement about the metering valve 600. It should be appreciated that the use of multiple bores on the outlet of the metering valve 600 that pass fluid from the metering valve 600 to a common discharge tube 609 may be used to reduce pressure losses across the metering valve 600 and to reduce pressure stresses that occur in these regions of the overall device. Using more than one bore 608 each having a smaller diameter reduces pressure stress around that bore. It should also be appreciated that each bore may be sized such that collectively the bores provide the necessary cross-sectional area to provide the desired total flow through the bores.

The metering valve 600 also includes two throttle plates 610, 612. One throttle plate 610 is disposed on the control side of the metering valve 600 or that side that controls the water being fed to the metering valve 600 and that is controlled by the servo-valve. The other throttle plate 612 is disposed on the discharge side of the metering valve 600 or that side that discharges the metered water to its end use, such as an injection nozzle. The throttle plates 610, 612, which contain throttle orifices or throttles or restrictors within certain passages or bores within each throttle plate as discussed further below, are used to control the switching behavior or opening and closing characteristics of the metering valve 600. It should be appreciated that the throttle plates 610, 612 can be easily replaced with different throttle plates having a slightly different design to impart a different effect on the switching behavior of the metering valve 600, which is described further below.

Multiple bores 614, 616 in the throttle plates 610, 612 are used to accommodate corresponding alignment pins to ensure the correct alignment of the throttle plates 610, 612 relative to the rest of the metering valve 600. The entire assembly is held together through the use of clamping bolts (not shown) that pass through corresponding bores 618 that pass through the housing of the metering valve 600.

The metering valve 600 also includes a bore 620 that extends from the control space of the metering valve 600 to an appropriate connector for connection to a pressure transducer. The pressure transducer could be used to monitor the water pressure in the control space of the metering valve 600. It should be appreciated that the use of a pressure transducer may be used to monitor or control the metering valve 600. For example, the output signal from the pressure transducer could be used in an electrical control system to monitor system operation and provide information to adjust operation of the metering valve 600 or to provide operating information that may necessitate switching or reworking the metering valve to a different metering valve. Further, monitoring the pressure may provide information that may be used to switch a throttle plate to adapt to a new operating condition.

The metering valve 600 as shown in FIG. 6 also shows the water connector 622 that fluidly connects to the servo-valve (not shown) to pass water from the control chamber 708 of the metering valve 600. Also, a drain or discharge valve 624 on the discharge side of the metering valve 600 is shown along with a connector 626 that fluidly connects the discharge valve 624 to a discharge line (not shown). The drain valve 624 provides the ability to drain fluid or water from the discharge or outlet bores 608 or the common discharge tube 609 through the drain valve 624 and ultimately through a drain or discharge bore 628 to the low pressure discharge.

Figure 7:
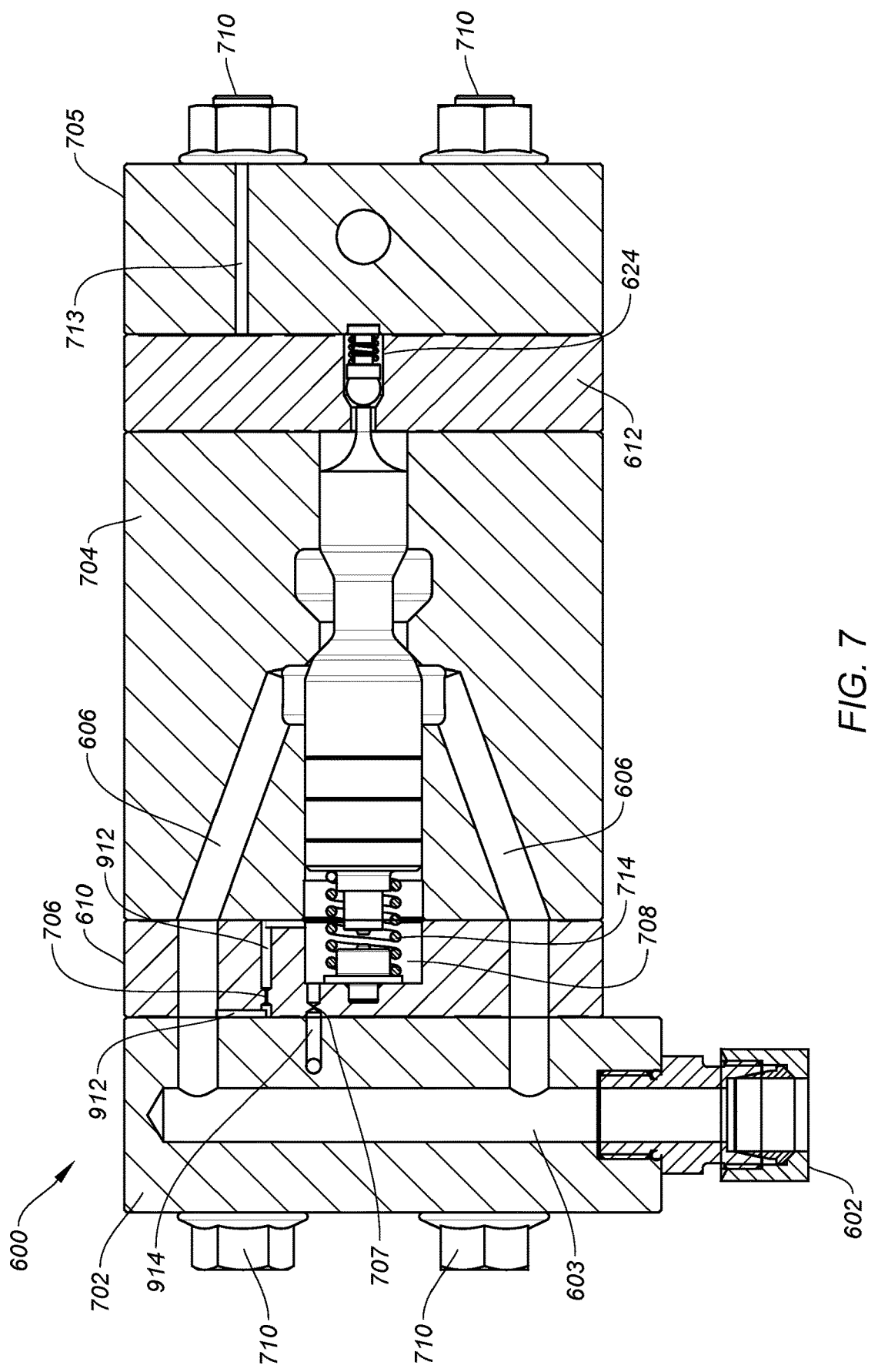
FIG. 7 is a cross-sectional plan view of the metering valve of FIG. 6 according to one embodiment of the present invention.

FIG. 7 is a cross-sectional plan view of the metering valve of FIG. 6 according to one embodiment of the present invention. In this view of the metering valve 600, which focuses on the control side of the metering valve 600, the water inlet port 602 and common inlet tube 603 are shown, as well as the supply tubes or bores 606. The throttle plate 610, used in connection with controlling the metering valve 600, is shown as disposed between two portions of the housing of the metering valve 600, an end portion 702 on the control side of the metering valve 600 and a middle portion 704 disposed between the end portion 702 and an opposite end portion 705 on the discharge side of the metering valve 600. Accordingly, the throttle plate 612 used in connection with controlling the discharge of water is shown as disposed between the middle portion 704 and the opposite end portion 705 of the housing of the metering valve 600. Clamping bolts 710 are used to hold the metering valve housing portions 702, 704, 705 and the throttle plates 610, 612 together.

A leak detection bore 713 is also provided. It should be appreciated that this bore 713 can be used for the detection of leaks from the system as discussed further below in connection with FIGS. 10A and 10B. It should be appreciated, however, that the bores 618 through which the clamping bolts 710 are placed provide a fluid connection from one throttle plate 610 to the other 612. This fluid connection permits fluid that may be leaking from the throttle plate 610 on the upstream side of the metering valve 600 to pass through such bore 618 and ultimately through the leak detection bore 713. This bore 713 can then be monitored for leak detection from either throttle plate 610, 612. During operation, any fluid leaking from either throttle plate 610, 612 will ultimately pass through the leak detection bore 713, the observance of which provides knowledge of a leak. For example, when the metering valve 600 is open, the drain valve 624 will be closed. Accordingly, should fluid be flowing through the bore 713, such would be indicative of a leak.

With reference also to FIGS. 9A and 9B, an inlet throttle orifice 706 is shown within an inlet throttle passage 912, which fluidly connects the supply bore 606 with the control chamber or space 708 of the metering valve 600 to allow fluid to pass from the supply bore 606 into the control chamber 708 of the metering valve 600. An outlet throttle orifice 707 is shown within an outlet throttle passage 914 to allow fluid to pass from the control chamber 708 of the metering valve 600 to the servo-valve (not shown).

Basically, the design of the throttle plate 610, including the design or size of the throttle orifices 706, 707, can be used to control the velocity of the opening and closing of the metering valve 600. Accordingly, different throttle plates having different designs for the throttle orifices can be used depending upon the conditions under which the metering valve will be operated, such as under different pressures and desired flow rates. Changing the throttle plates can be done by removing the clamping bolts 710 and replacing a given throttle plate with a different throttle plate have the desired throttle orifices design or size. It should be appreciated that the operation of the metering valve 600, including the spring 714 in the control chamber 708 is the same as that described above in connection with FIGS. 1, 2A, 2B, and 2C, including its connection to the servo-valve (not shown in FIG. 7).

Figure 8:
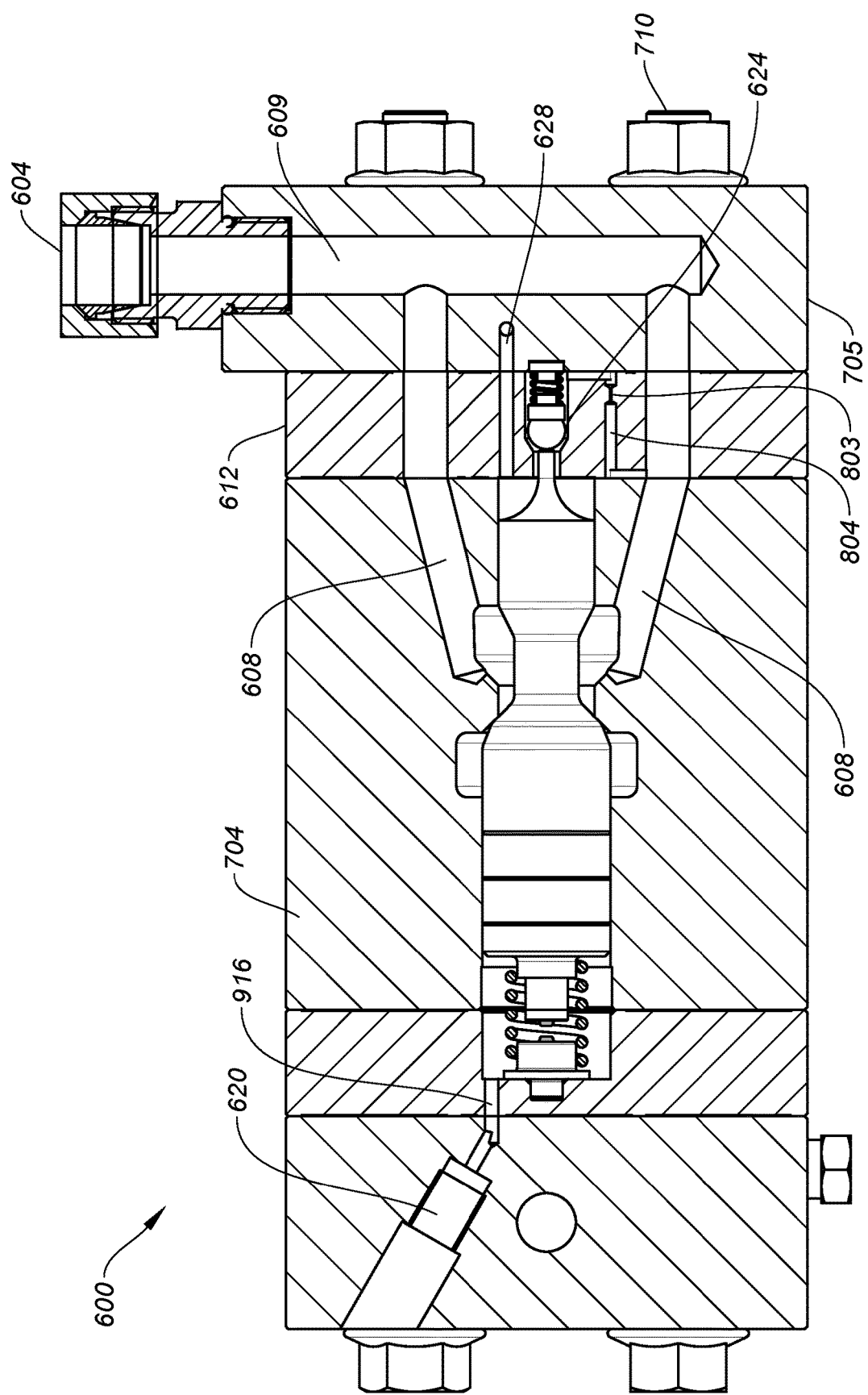
FIG. 8 is another cross-sectional plan view of the metering valve of FIG. 6 according to one embodiment of the present invention.

FIG. 8 is a cross-sectional plan view of the metering valve of FIG. 6 according to one embodiment of the present invention. It should be appreciated that this cross-sectional view is offset by 90° from the view shown in FIG. 7 and focuses on the discharge side of the metering valve 600. The water discharge port 604 and common discharge tube 609 are shown, as well as the discharge tubes or bores 608 that pass water from the metering valve 600 when it is in an open position. The throttle plate 612, used in connection with controlling the drain or discharge valve 624, is shown as disposed between two portions of the housing of the metering valve 600, the opposite end portion 705 on the discharge side of the metering valve 600 and the middle portion 704 disposed between the end portion 702 on the inlet or control side of the metering valve 600. Also shown is the bore 620 that extends from the control space of the metering valve 600 to an appropriate connector for connection to a pressure transducer as discussed above in connection with FIG. 7. Also, as shown and with reference to FIG. 9A, bore 916 provides a passage for fluid connection from the control chamber or space 708 of the metering valve 600 to a pressure transducer 620.

Figures 10A, 10B:
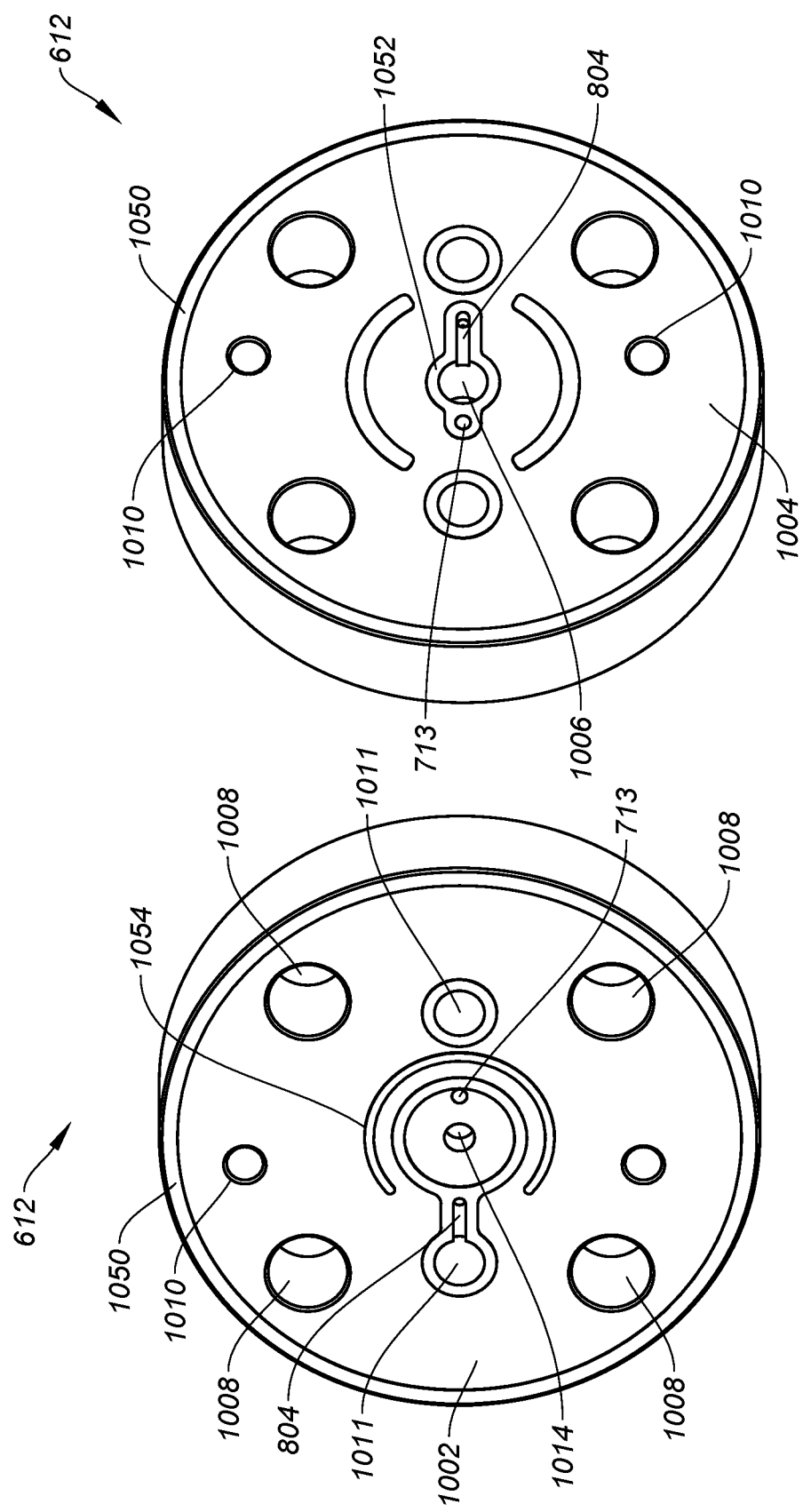
FIG. 10A is a perspective view of another throttle plate for the metering valve of FIG. 6 according to one embodiment of the present invention.
FIG. 10B is another perspective view of the throttle plate of FIG. 10A according to one embodiment of the present invention.

FIG. 8 also illustrates the drain valve or discharge valve 624. With reference also to FIGS. 10A and 10B, the throttle plate 612 provides a discharge or drain throttle orifice 803 within a drain throttle passage 804 to control the fluid discharge from the discharge or outlet bores 608 or the common discharge tube 609 through the drain valve 624 and ultimately through a drain or discharge bore 628 to the low pressure, as described in connection with FIGS. 2A, 2B, and 2C. When the metering valve 600 is closed, the metering valve 600 pushes the ball of the drain valve 624 into an open position against the force of the spring. The drain throttle orifice 803 allows water to pass from the discharge bores 608 through the discharge valve 624 and out of the system. It should be appreciated that this drain or discharge valve 624 controls the flow of water from the discharge bores 608, the common discharge tube 609, and the corresponding lines through which the water is discharged from the metering valve 600 (e.g., the fluid lines leading to the injection point or injection nozzle) during periods when the system is not injecting fluid and the metering valve 600 is closed. As described above, during periods when fluid is not being metered and the metering valve 600 is closed, fluid may be present in the downstream lines, such as in the discharge bores 608, the common discharge tube 609, or the corresponding lines through which the water is discharged from the metering valve 600. The fluid presenting in these locations may increase in temperature thereby causing an increase in pressure that may be sufficient to overcome the pressure necessary to inject fluid into a given stream, such as water into a steam stream to be attemperated. In this case, an unintended or uncontrolled injection of fluid into the stream may occur. To minimize or avoid this situation, the discharge bores 608 are sized to allow the passage of any fluid in these locations to pass through the drain valve 624 and to be discharged from the system through the drain or discharge line 628.

FIG. 9A is a perspective view of a throttle plate for the metering valve of FIG. 6 according to one embodiment of the present invention, and FIG. 9B is another perspective view of the throttle plate of FIG. 9A according to one embodiment of the present invention. Specifically, FIGS. 9A and 9B illustrate the throttle plate 610 for use in connection with the control chamber of the metering valve 600. FIG. 9A illustrates an upstream (with reference to the general direction of the flow of the metered water from left to right in FIG. 7) side 902 of the throttle plate 610 or the side that faces outward or away from the metering valve 600 (i.e., the side facing toward the left of FIG. 7), and FIG. 9B illustrates the opposite downstream side 904 of the throttle plate 610 or the side that faces inward or toward the metering valve 600 (i.e., the side facing toward the right of FIG. 7).

Also with reference to FIG. 7, it can be seen that the downstream side 904 of the throttle plate 610 has a circular recess 906 that accommodates the control portion or end of the metering valve 600. The throttle plate 610 also has openings 908 to accommodate the clamping bolts and openings 910 to accommodate the alignment pins 616. The throttle plate 610 also has openings 911 to accommodate the supply tubes or bores 606 that pass water from the water inlet port 602 to the metering valve 600. The throttle plate 610 also includes a bore 916 that extends from the control space of the metering valve 600 to an appropriate connector for connection to a pressure transducer as described above in connection with FIGS. 6 and 8.

The throttle plate 610 has an inlet throttle orifice 706 located within the inlet throttle passage 912 that fluidly connects the supply bore 606 with the control chamber or space 708 of the metering valve 600 to allow fluid to pass from the supply bore 606 into the control chamber 708 of the metering valve 600. With reference to FIG. 7, the inlet throttle orifice 706 within the throttle plate 610 is sized to provide the desired fluid flow from the high pressure water in the connected supply bore 606 into the control section of the metering valve 600.

Similarly, the throttle plate 610 has an outlet throttle orifice 707 within the outlet throttle passage 914 that fluidly connects the control chamber 708 of the metering valve 600 to the servo-valve (not shown). The recess 906 in the downstream side 904 of the throttle plate 610 provide an outlet throttle passage 914 that passes through to the upstream side 902 of the throttle plate 610. Again, with reference to FIG. 7, the outlet throttle orifice 707 within the throttle plate 610 is sized to provide the desired fluid flow from the control chamber 708 of the metering valve 600 to the servo-valve.

It should be appreciated that certain areas on the surface of the upstream side 902 and on the surface of the downstream side 904 of the throttle plate 610 are raised and are higher than other areas. For example, in some embodiments the raised portions may be higher than the surface of the lower portions by approximately 0.1 mm. As shown, the perimeter 950 of the overall throttle plate 610 on both sides 902, 904 of the throttle plate 610, the perimeter of the bores 911 for the supply tubes or bores 606 on both sides 902, 904 of the throttle plate 610, the corresponding perimeter of the inlet throttle passage 912 on both sides 902, 904 of the throttle plate 610, the perimeter of the recess 906 on the downstream side 904 of the throttle plate 610, and a partial circular portion 952 on the upstream side 904 corresponding to a portion of the raised perimeter of the recess 906, the perimeter of the outlet throttle orifice on the upstream side 902 of the throttle plate 610, and a portion 954 between the recess 906 and the supply tube 606 opposite to that used in connection with the inlet throttle passage 912 are each raised relative to the remainder of the surfaces of the upstream and downstream sides 902, 904 of the throttle plate 610. These raised areas are contact areas designed to provide a seal when clamped by the clamping bolts 710. It should be appreciated that the faces of the surfaces of the housing of the metering valve adjacent to the upstream and downstream sides 902, 904 of the throttle plate 610 against which these sides are clamped are simply flat and will similarly provide a seal when clamped by the clamping bolts 710. Accordingly, it should be appreciated that when the device is clamped together, the lower areas are fluidly connected.

FIG. 10A is a perspective view of a throttle plate for the metering valve of FIG. 6 according to one embodiment of the present invention, and FIG. 10B is another perspective view of the throttle plate of FIG. 10A according to one embodiment of the present invention. Specifically, FIGS. 10A and 10B illustrate the throttle plate 612 for use in connection with the discharge valve 624 of the overall metering valve 600. FIG. 10A illustrates an upstream (with reference to the general direction of flow of the metered water from left to right in FIG. 8) side 1002 of the throttle plate 612 or the side that faces the metering valve 600 and supply bores 606 (i.e., the side facing toward the left of FIG. 8), and FIG. 10B illustrates the opposite downstream side 1004 of the throttle plate 612 or the side that faces away from the metering valve 600 (i.e., the side facing toward the right of FIG. 8).

With reference to FIG. 8, it can be seen that the downstream side 1004 of the throttle plate 612 has a circular opening 1006 that accommodates the drain valve 624. The throttle plate 612 also has openings 1008 to accommodate the clamping bolts and openings 1010 to accommodate the alignment pins 616. The throttle plate 612 also has openings 1011 to accommodate the discharge tubes or bores 608 that pass water from the metering valve 600 to the common discharge tube 609 and ultimately to the point of injection.

The throttle plate 612 has a drain throttle orifice 803 within the drain throttle passage 804 that fluidly connects the outlet bores 608 and the drain or discharge valve 624 to allow fluid to pass from the discharge or outlet bores 608 or the common discharge tube 609 through the drain valve 624 and ultimately through a drain or discharge bore 628 to the low pressure side. With reference to FIG. 8, the drain throttle orifice 803 within the throttle plate 612 is sized to permit or accommodate the desired fluid flow from the discharge or outlet bores 608 or the common discharge tube 609 through the drain valve 624. As described above, the drain valve 624 provides the ability to avoid or minimize any accidental injections of fluid at the end point by providing a discharge of any accumulated fluid in the outlet bores 608 or the common discharge tube 609 or in any piping or tubing between the outlet bores 608 and the point of injection or at the injection nozzle.

Similarly to the throttle plate 610 used in connection with the metering valve 600, it should be appreciated that certain areas on the surface of the upstream side 1002 and on the surface of the downstream side 1004 of the throttle plate 612 are raised and are higher than other areas. For example, in some embodiments the raised portions may be higher than the surface of the lower portions by approximately 0.1 mm. As shown, the perimeter 1050 of the overall throttle plate 612 on both sides 1002, 1004 of the throttle plate 612, the perimeter of the bores 1011 for the discharge tubes or bores 608, a portion 1052 and corresponding perimeter of the inlet throttle passage 804 on the downstream side of the throttle plate 612, the perimeter of the opening 1014 and corresponding perimeter of the inlet throttle passage 804 on the upstream side 1002 of the throttle plate 612, a partial circular portion 1054 on the upstream side 1002, and two semicircular portions 1056 on the downstream side 1004 of the throttle plate 912 are each raised relative to the remainder of the surfaces of the upstream and downstream sides 1002, 1004 of the throttle plate 612. These raised areas are contact areas designed to provide a seal when clamped by the clamping bolts 710. It should be appreciated that the faces of the surfaces of the housing of the metering valve adjacent to the upstream and downstream sides 1002, 1004 of the throttle plate 612 against which these sides are clamped are simply flat and will similarly provide a seal when clamped by the clamping bolts 710.

Similarly to the throttle plate 610 used in connection with the metering valve 600, the lower areas of the throttle plate 612 are all fluidly connected and are fluidly connected along the bores 618 used for the clamping bolts 710. Accordingly, as described above in connection with FIG. 7, this fluid connection permits fluid that may be leaking from the throttle plate 610 on the upstream side of the metering valve 600 or from the throttle plate 612 to pass through the leak detection bore 713. This bore 713 can then be monitored for leak detection from either throttle plate 610, 612.

With reference to FIGS. 9A, 9B, 10A, and 10B, it should be appreciated that the design of the orifices in the respective throttle plates can be used to provide a desired level of control over the flow characteristics or the corresponding metering valve and discharge valve. These characteristics and the desired throttle or orifice designs will be dependent upon the intended use of the overall metering system. Accordingly, different throttle plates having different designs for the throttle orifices can be used depending upon the conditions under which the metering valve will be operated, such as under different pressures and desired flow rates. Changing the throttle plates can be done by removing the clamping bolts 710 and replacing a given throttle plate with a different throttle plate have the desired throttle orifices design or size. Because the throttle plates can be changed for a given metering valve/discharge valve housing, having more than one throttle plate, each with a differently designed throttle or orifices, provides flexibility to the metering system. For example, the same metering system can be used for a given application, even if the operating conditions for that application change, such as, for example, operating conditions that require a change in the amount of fluid injected. In that case, a different throttle plate may simply be substituted for the current throttle plate, thereby altering the operating conditions of the metering system to meet the changed operating conditions. Similarly, a given metering system can be moved from one application to a different application by using different throttle plates to meet the conditions required for the new application. For example, the same metering system may be used to inject fluid into a pipe of a given diameter and then used for a pipe of a different diameter simply by changing the throttle plates to accommodate the change in pipe diameter.

Various embodiments of the invention have been described above. However, it should be appreciated that alternative embodiments are possible and that the invention is not limited to the specific embodiments described above. For example, the present metering system provide significant flexibility to accommodate different operating conditions or different applications or uses. For example, different throttle plates can be used to adjust the operating conditions of the metering system as desired. The spring force and valve seat lift for both the metering valve and the discharge valve can be altered to similarly accommodate different operating requirements. So, can play around with spring force, throttle plates, valve seat or lift to adjust desired metering characteristics of the valve. For example, will want a given flow rate in a given use. By adjusting, for example, the throttle plates, the same unit can be used in a different setting that requires a different metering flow characteristic, such as in a different diameter pipe in which water will be injected. In another example, operating conditions may dictate a different amount of water injection than currently being used. In this case, throttle plates may be changed to adapt to the new operating conditions and to provide the requisite amount of water metering or injection. In other embodiments, multiple injection nozzles may be used that are fed using one common metering valve. Such may be replaced using multiple nozzles, each with a corresponding dosing unit and servo-valve according to embodiments of the present invention.

What is claimed is:

1. An apparatus for metering a fluid, comprising:
a metering valve for metering a fluid;
a servo-valve comprising an actuator for operating said servo-valve;
a tube having a first end connected to said servo-valve and an opposite second end for connection to said metering valve and to allow said servo-valve to control said metering valve, wherein said tube has a predetermined length to thermally isolate said actuator and said servo-valve from said metering valve to prevent an increase in a temperature of said actuator caused by heat from said metering valve above an operating temperature of said actuator; and
a discharge valve for discharging fluid from a discharge line that carries the fluid from the metering valve to a point of use when said metering valve is closed, wherein said discharge valve is actuated by said metering valve.

2. The apparatus of claim 1, further comprising:
a first removable throttle for controlling fluid flow between said servo-valve and said metering valve; and
a second removable throttle for controlling fluid flow through said discharge valve.

3. A system for attemperating a gas stream generated by a power plant, comprising:
an injection valve for injecting a fluid into a gas stream generated by a power plant to attemperate the gas stream;
a metering valve for feeding the fluid to the injection valve through a feed line;
a discharge valve connected to said metering valve to discharge fluid from the feed line when the injection valve and the metering valve are closed, wherein said discharge valve is actuated by said metering valve;
a servo-valve for opening and closing the metering valve; and
a tube having a first end connected to said servo-valve and an opposite second end for connection to said metering valve, wherein said tube has a predetermined length to thermally isolate said actuator and said servo-valve from said metering valve to prevent an increase in a temperature of said actuator caused by heat from said metering valve above an operating temperature of said actuator.

* * * * *